(12) United States Patent
Shaw

(10) Patent No.: US 10,735,595 B2
(45) Date of Patent: Aug. 4, 2020

(54) VISUAL VOICE MAIL DELIVERY MECHANISMS

(71) Applicant: AT&T Intellectual Property I, L.P., Atlanta, GA (US)

(72) Inventor: Venson M. Shaw, Kirkland, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 11 days.

(21) Appl. No.: 15/405,978

(22) Filed: Jan. 13, 2017

(65) Prior Publication Data
US 2017/0134582 A1 May 11, 2017

Related U.S. Application Data

(63) Continuation of application No. 14/719,802, filed on May 22, 2015, now Pat. No. 9,584,666, which is a continuation of application No. 13/277,744, filed on Oct. 20, 2011, now Pat. No. 9,042,527.

(51) Int. Cl.
*H04M 3/537* (2006.01)
*H04M 1/725* (2006.01)
*H04M 3/533* (2006.01)

(52) U.S. Cl.
CPC ......... *H04M 3/537* (2013.01); *H04M 1/7255* (2013.01); *H04M 3/53333* (2013.01); *H04M 3/53366* (2013.01); *H04M 2201/60* (2013.01); *H04M 2203/4545* (2013.01)

(58) Field of Classification Search
CPC ............. H04M 3/53333; H04M 3/537; H04M 2201/60; H04M 2203/4545; H04M 1/7255; H04M 3/53336; H04M 3/53366
USPC ................. 379/67.1–88.28; 455/412.1–426.2
See application file for complete search history.

(56) References Cited

U.S. PATENT DOCUMENTS

| | | |
|---|---|---|
| 5,260,986 A | 11/1993 | Pershan |
| 5,434,906 A | 7/1995 | Robinson et al. |
| 5,434,908 A | 7/1995 | Klein |
| 5,459,717 A | 10/1995 | Mullan et al. |
| 5,608,786 A | 3/1997 | Gordon |
| 5,630,060 A | 5/1997 | Tang et al. |
| 5,740,231 A | 4/1998 | Cohn et al. |
| 5,742,763 A | 4/1998 | Jones |
| 5,742,905 A | 4/1998 | Pepe et al. |
| 5,764,899 A | 6/1998 | Eggleston et al. |
| 5,802,510 A | 9/1998 | Jones |
| 5,809,128 A | 9/1998 | McMullin |
| 5,832,062 A | 11/1998 | Drake |
| 5,870,454 A | 2/1999 | Dahlen |
| 5,943,648 A | 8/1999 | Tel |

(Continued)

OTHER PUBLICATIONS

U.S. Appl. No. 13/287,324, filed Nov. 2, 2011, Shaw.

(Continued)

*Primary Examiner* — Hemant S Patel
(74) *Attorney, Agent, or Firm* — BakerHostetler

(57) ABSTRACT

Systems and methods for voice mail delivery may include receiving a voicemail by a device of a subscriber, determining if the subscriber is a member of a group of members, and, upon a determination that the subscriber is a member of the group, combining the voice mail message with a second voice mail message received by a member of the group other than the subscriber to generate a combined voice mail message.

19 Claims, 18 Drawing Sheets

(56) References Cited

U.S. PATENT DOCUMENTS

| | | | |
|---|---|---|---|
| 5,970,122 A | 10/1999 | LaPorta et al. | |
| 5,974,449 A | 10/1999 | Chang et al. | |
| 5,987,100 A | 11/1999 | Fortman et al. | |
| 6,014,429 A | 1/2000 | LaPorta et al. | |
| 6,069,939 A | 5/2000 | Fung et al. | |
| 6,085,101 A | 7/2000 | Jain et al. | |
| 6,091,947 A | 7/2000 | Sumner | |
| 6,188,683 B1 | 2/2001 | Lang et al. | |
| 6,195,568 B1 | 2/2001 | Irvin | |
| 6,212,550 B1 | 4/2001 | Segur | |
| 6,215,858 B1 | 4/2001 | Bartholomew et al. | |
| 6,249,808 B1 * | 6/2001 | Seshadri | H04L 29/06 709/203 |
| 6,266,399 B1 | 7/2001 | Weller et al. | |
| 6,360,256 B1 | 3/2002 | Lim | |
| 6,389,114 B1 | 5/2002 | Dowens et al. | |
| 6,404,876 B1 | 6/2002 | Smith et al. | |
| 6,438,217 B1 * | 8/2002 | Huna | H04M 1/64 379/88.14 |
| 6,449,646 B1 | 9/2002 | Sikora et al. | |
| 6,463,462 B1 * | 10/2002 | Smith | G06Q 10/107 709/206 |
| 6,493,685 B1 | 12/2002 | Ensel et al. | |
| 6,507,643 B1 | 1/2003 | Groner | |
| 6,560,318 B1 | 5/2003 | Spielman et al. | |
| 6,570,983 B1 | 5/2003 | Speeney et al. | |
| 6,606,373 B1 * | 8/2003 | Martin | H04M 3/5307 379/88.01 |
| 6,618,474 B1 | 9/2003 | Reese | |
| 6,621,800 B1 | 9/2003 | Klein | |
| 6,636,587 B1 | 10/2003 | Nagai et al. | |
| 6,671,061 B1 | 12/2003 | Joffe et al. | |
| 6,711,154 B1 | 3/2004 | O'Neal | |
| 6,785,367 B2 | 8/2004 | Horvath et al. | |
| 6,826,270 B1 | 11/2004 | Welch et al. | |
| 6,839,411 B1 | 1/2005 | Saltanov et al. | |
| 6,904,131 B2 | 6/2005 | Weksel | |
| 6,950,504 B1 | 9/2005 | Marx et al. | |
| 6,987,840 B1 | 1/2006 | Bosik et al. | |
| 6,990,179 B2 | 1/2006 | Merrow et al. | |
| 7,010,100 B1 | 3/2006 | Garg et al. | |
| 7,072,452 B1 | 7/2006 | Roberts et al. | |
| 7,085,357 B2 | 8/2006 | Gavette et al. | |
| 7,251,313 B1 | 7/2007 | Miller et al. | |
| 7,272,400 B1 * | 9/2007 | Othmer | H04L 12/1886 370/338 |
| 7,283,808 B2 | 10/2007 | Castell et al. | |
| 7,340,246 B1 | 3/2008 | Kanerva et al. | |
| 7,359,493 B1 | 4/2008 | Wang et al. | |
| 7,369,649 B2 | 5/2008 | Zhong | |
| 7,424,098 B2 | 9/2008 | Kovales et al. | |
| 7,483,525 B2 | 1/2009 | Chaddha et al. | |
| 7,492,872 B1 | 2/2009 | Di Carlo et al. | |
| 7,649,983 B2 | 1/2010 | O'Neal | |
| 7,664,249 B2 | 2/2010 | Horvitz et al. | |
| 7,693,267 B2 | 4/2010 | Howell et al. | |
| 7,746,987 B1 | 6/2010 | Becker et al. | |
| 7,903,794 B1 | 3/2011 | Bales et al. | |
| 7,925,708 B2 | 4/2011 | Davis et al. | |
| 7,974,397 B2 | 7/2011 | Lund | |
| 7,996,473 B2 | 8/2011 | Braam | |
| 8,005,461 B2 | 8/2011 | Vander Veen et al. | |
| 8,077,838 B2 | 12/2011 | Patel et al. | |
| 8,081,745 B2 | 12/2011 | Burrell et al. | |
| 8,145,196 B2 | 3/2012 | Wood et al. | |
| 8,155,282 B2 | 4/2012 | Thaper et al. | |
| 8,155,627 B2 | 4/2012 | Hao et al. | |
| 8,161,116 B2 | 4/2012 | Chaddha et al. | |
| 8,223,930 B2 | 7/2012 | Narang et al. | |
| 8,224,296 B2 | 7/2012 | Shaw | |
| 8,265,602 B2 | 9/2012 | Shaw | |
| 8,280,451 B1 | 10/2012 | Zheng et al. | |
| 8,351,905 B1 | 1/2013 | Shaw | |
| 8,355,703 B2 | 1/2013 | Shaw | |
| 8,358,752 B2 | 1/2013 | Shaw et al. | |
| 8,374,316 B2 | 2/2013 | Burckart et al. | |
| 8,385,513 B2 | 2/2013 | Howell et al. | |
| 8,416,928 B2 | 4/2013 | Ramamoorthy et al. | |
| 8,457,602 B2 | 6/2013 | Gravino et al. | |
| 8,805,330 B1 | 8/2014 | Horton et al. | |
| 9,042,527 B2 | 5/2015 | Shaw | |
| 9,282,185 B2 | 3/2016 | Shaw | |
| 2001/0005837 A1 | 6/2001 | Kojo | |
| 2002/0001371 A1 | 1/2002 | Goldberg et al. | |
| 2002/0110226 A1 * | 8/2002 | Kovales | H04M 3/533 379/88.17 |
| 2002/0161775 A1 | 10/2002 | Lasensky et al. | |
| 2002/0172331 A1 | 11/2002 | Barker | |
| 2003/0018720 A1 | 1/2003 | Chang et al. | |
| 2004/0082314 A1 | 4/2004 | Shaw et al. | |
| 2004/0127200 A1 | 7/2004 | Shaw et al. | |
| 2004/0146145 A1 * | 7/2004 | Kiser, Jr. | H04L 51/00 379/88.16 |
| 2004/0208297 A1 | 10/2004 | Valentine | |
| 2004/0254998 A1 | 12/2004 | Horvitz | |
| 2005/0010679 A1 | 1/2005 | Yamaga et al. | |
| 2005/0083915 A1 | 4/2005 | Mathew et al. | |
| 2005/0114462 A1 | 5/2005 | Mathew et al. | |
| 2005/0132016 A1 | 6/2005 | Boone | |
| 2005/0172033 A1 | 8/2005 | Mathew et al. | |
| 2005/0180548 A1 | 8/2005 | Moore | |
| 2005/0212659 A1 | 9/2005 | Sauer | |
| 2005/0255867 A1 | 11/2005 | Nicodem | |
| 2005/0271188 A1 | 12/2005 | Kraft et al. | |
| 2006/0053227 A1 | 3/2006 | Ye et al. | |
| 2006/0072720 A1 | 4/2006 | Blohm | |
| 2006/0136556 A1 | 6/2006 | Stevens et al. | |
| 2006/0262911 A1 | 11/2006 | Chin et al. | |
| 2007/0115926 A1 | 5/2007 | Chahal et al. | |
| 2007/0174108 A1 | 7/2007 | Monster | |
| 2007/0207785 A1 | 9/2007 | Chatterjee et al. | |
| 2007/0211868 A1 | 9/2007 | Banda et al. | |
| 2007/0217579 A1 | 9/2007 | Sobti et al. | |
| 2007/0239895 A1 | 10/2007 | Alperin et al. | |
| 2008/0109462 A1 | 5/2008 | Adams et al. | |
| 2008/0133323 A1 | 6/2008 | Willms | |
| 2008/0273675 A1 | 11/2008 | Siminoff | |
| 2008/0298559 A1 | 12/2008 | Nanjundaswamy | |
| 2009/0067593 A1 | 3/2009 | Ahlin | |
| 2009/0180598 A1 | 7/2009 | Othmer et al. | |
| 2009/0248507 A1 | 10/2009 | Hamaoui et al. | |
| 2009/0252305 A1 | 10/2009 | Rohde et al. | |
| 2010/0035584 A1 | 2/2010 | Hadinata et al. | |
| 2010/0057872 A1 | 3/2010 | Koons et al. | |
| 2010/0111270 A1 | 5/2010 | Langos | |
| 2010/0169424 A1 * | 7/2010 | Gustafsson | H04L 51/14 709/206 |
| 2010/0250672 A1 | 9/2010 | Vance et al. | |
| 2010/0273443 A1 | 10/2010 | Forutanpour et al. | |
| 2010/0306061 A1 | 12/2010 | Wagner | |
| 2011/0060803 A1 | 3/2011 | Barlin et al. | |
| 2011/0098021 A1 | 4/2011 | Shaw et al. | |
| 2011/0098022 A1 | 4/2011 | Shaw et al. | |
| 2011/0116610 A1 | 5/2011 | Shaw et al. | |
| 2011/0117887 A1 | 5/2011 | Shaw et al. | |
| 2011/0119258 A1 | 5/2011 | Forutanpour et al. | |
| 2011/0143716 A1 | 6/2011 | Shaw | |
| 2011/0143722 A1 | 6/2011 | Shaw et al. | |
| 2011/0143723 A1 | 6/2011 | Shaw et al. | |
| 2011/0143725 A1 | 6/2011 | Shaw | |
| 2011/0177796 A1 | 7/2011 | Jacobstein et al. | |
| 2011/0244834 A1 | 10/2011 | Martens et al. | |
| 2011/0300832 A1 | 12/2011 | Shaw | |
| 2011/0300833 A1 | 12/2011 | Shaw | |
| 2011/0305327 A1 | 12/2011 | Shaw | |
| 2012/0029917 A1 | 2/2012 | Chang et al. | |
| 2012/0058744 A1 * | 3/2012 | Felt | H04M 3/382 455/414.1 |
| 2012/0114108 A1 | 5/2012 | Katis et al. | |
| 2012/0121077 A1 | 5/2012 | Gabay et al. | |
| 2012/0202535 A1 | 8/2012 | Chaddha et al. | |
| 2012/0322415 A1 | 12/2012 | Shaw | |
| 2013/0023287 A1 | 1/2013 | Shaw et al. | |

(56) References Cited

U.S. PATENT DOCUMENTS

2013/0094637 A1    4/2013   Shaw
2013/0101096 A1    4/2013   Shaw
2013/0108032 A1    5/2013   Shaw
2013/0122871 A1    5/2013   Shaw

OTHER PUBLICATIONS

U.S. Appl. No. 13/277,589, filed Oct. 20, 2011, Shaw.
U.S. Appl. No. 13/274,944, filed Oct. 17, 2011, Shaw.
U.S. Appl. No. 13/297,731, filed Nov. 16, 2011, Shaw.

\* cited by examiner

VISUAL VOICE MAIL DELIVERY MECHANISMS

CROSS-REFERENCE TO RELATED APPLICATIONS

This application is a continuation of U.S. patent application Ser. No. 14/719,802, filed May 22, 2015, which is a continuation of U.S. patent application Ser. No. 13/277,744, filed Oct. 20, 2011, now U.S. Pat. No. 9,042,527, which is related by subject matter to co-pending U.S. patent application Ser. No. 13/297,731, filed Nov. 16, 2011, now U.S. Pat. No. 8,489,075, issued Jul. 16, 2013, U.S. patent application Ser. No. 13/274,944, filed Oct. 17, 2011, U.S. patent application Ser. No. 13/277,589, filed Oct. 20, 2011, and U.S. patent application Ser. No. 13/287,324, filed Nov. 2, 2011, now U.S. Pat. No. 8,515,029, issued Aug. 20, 2013. The contents of each of the above referenced applications and patents are incorporated by reference herein in their entirety.

TECHNICAL FIELD

This disclosure is directed to visual voice mail generally, and more specifically, to systems and methods for customized visual voice mail delivery.

BACKGROUND

The emergence of visual voice mail has made the use of voice mail more convenient and user friendly. This is especially true for heavy users who may have dozens of unread voice mails at one time stored on a server for delivery. Rather than have to serially listen to each individual voice mail message, visual voice mail users are able to see a summary of the incoming messages and select which messages to review and in which order to review them.

Some advanced voice mail systems also will translate voice messages to text messages in order to deliver voice mail messages in a more convenient format for some users under some circumstances. Voice mail indication signals are also used for the convenience of the subscriber to indicate the receipt of a voice mail.

Mobile long term evolution (LTE) networks are also being deployed. Such high speed networks may more efficiently transport voice and data among and between users. Thus there is a need to be able to adapt visual voice mail features and functionality in order to take advantage of LTE.

SUMMARY

This disclosure is directed to a method of selecting a distribution list for a voice mail message including the steps of identifying a group of recipients with whom to share the voice mail message, creating a user profile which includes voice mail preferences of a subscriber and the group of recipients, the preferences including an indication as whether to share the voice mail message with the group of recipients, and distributing the voice mail message based on the preferences. The method may also include wherein the voice mail message is distributed to the group of recipients and wherein the voice mail message is converted to a text message and the text message may be amended by one or more members of the group of recipients. The method may further include wherein the text message is amended by one of editing a portion of the text message, deleting a portion of the text message and adding to the text message. The group may be part of a social networking group. The subscriber may override the user profile to change the distribution for an individual voice mail message. The method may further include determining the sender of the voice mail wherein the distributing step is based on the determining step.

The present disclosure is also directed to a method of selecting a delivery time of a voice mail message in a network including the steps of identifying a criteria for delivery of a voice mail message, monitoring the load of the network, and delivering the voice mail message at a time determined based on the criteria and the monitoring step. The criteria may be the presence of a subscriber, a preference of a delivery time of day of the subscriber, and the availability of a subscriber.

The present disclosure is also directed to a method for delivering voice mail to a subscriber including converting the voice mail message to text, partitioning the text into segments, delivering a first segment to the subscriber, receiving an indication from the subscriber that a second segment is to be delivered to the subscriber and delivering a second segment based on the receiving step. Additionally the first segment may be sent to a recipient in addition to the subscriber wherein the second segment is delivered to the recipient upon receipt of an indication from the recipient and wherein the second segment is delivered to the recipient independent of whether there is a receipt of an indication from the subscriber. The recipient may be part of a social network.

The present disclosure is also directed to a method for delivering voice mail to a subscriber including decomposing the voice mail message to objects, presenting the objects to the subscriber for viewing, receiving an indication from the subscriber that the subscriber desires delivery of the voice mail message, and delivering the voice mail message to the subscriber based on the receiving step. The voice mail message may also be delivered to a recipient in addition to the subscriber including when the subscriber is part of a social network.

The present disclosure is also directed to a method including receiving a voice mail message for a subscriber, determining if the subscriber is a member of a group of members, and upon a determination that the subscriber is a member of the group, combining the voice mail message with a second voice mail message received by a member of the group other than the subscriber to generate a combined voice mail message.

The present disclosure is also directed to a system including a processor and memory coupled to the processor, the memory comprising executable instructions that when executed by the processor cause the processor to effectuate operations including receiving, by a device of a subscriber, a voice mail message, determining if the subscriber is a member of the group, and upon a determination that the subscriber is a member of the group, combining the voice mail message with a second voice mail message received by a member of the group other than the subscriber to generate a combined voice mail message.

The present disclosure is also directed to a computer-readable storage medium comprising executable instructions that when executed by a processor cause the processor to effectuate operations comprising receiving, by a device of a subscriber, a voice mail message, determining if the subscriber is a member of a group of members, and upon a determination that the subscriber is a member of the group, combining the voice mail message with a second voice mail message received by a member of the group other than the subscriber to generate a combined voice mail message.

BRIEF DESCRIPTION OF THE DRAWINGS

The following description is better understood when read in conjunction with the appended drawings.

DETAILED DESCRIPTION OF ILLUSTRATIVE EMBODIMENTS

In the description that follows, the "recipient" or "subscriber" are used interchangeably and should be interpreted as the called party for whom the visual voice mail is intended.

Figure 1:
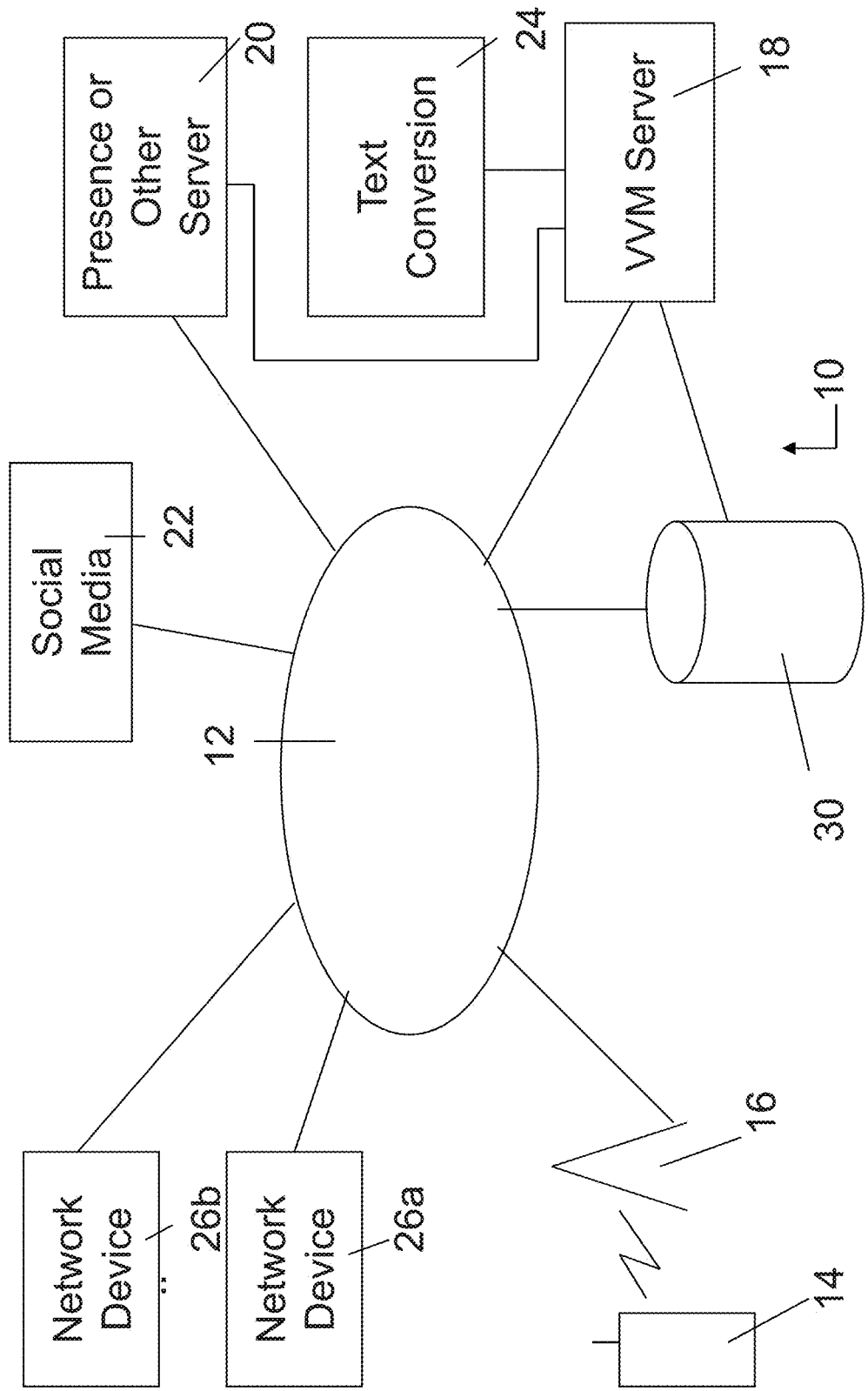
FIG. 1 is a system diagram in which an embodiment of the disclosure may be implemented.

With reference to FIG. 1, there is shown the system 10 which may be constructed in an exemplary embodiment of the present invention. There is a network 12 which in a preferred embodiment, is the Internet using standard IP protocols. There is also shown a wireless communication device 14 in communication with a cellular antenna 16 connected by a wireless network. The wireless network may be a Long Term Evolution (LTE) network, also known as 4G, or any type of cellular network, including but not limited to GSM, CDMA, WCDMA, 3GPP, Edge, 4G, or any other type of cellular network, and may also be any other type of wireless network, including WI-FI, WI-max, WLAN or any other type of wireless network capable of transmitting data. Attached to the network 12 are one or more network devices 26a, 26b such as workstations, it being understood by those skilled in the art that such peripheral devices may also include netbook computers, PDA's, internet-enabled mobile telephones, and any other peripheral device capable or sending or receiving data to and from the Internet. Also attached to the network is a visual voice mail server (VVM) 18 which is in direct communication with other servers 20, including a presence server. The presence or other servers 20 are also in direct communication with the network 12 and may, for example, include location servers, presence servers, advertising servers, or any other type of server provided either by wireless network operators or by third parties. The VVM server 18 is also in direct communication with a text conversion server 24 which is capable of converting visual voice mail from text to speech and speech to text. There is also a database 30 which is accessible over the network 12 by a user of a mobile device 14 or the VVM server 18 or any of the other servers 20 which are authorized to access the database 30. The database may, for example, include provisioning information, subscription information, preference information or other network control or user information relating to the user of the mobile device 14. The database may be standalone or be part of other databases that service the network, including home location registers (HLRs) or visitor location registers (VLRs). Also shown connected to the network 12 in FIG. 1 is a social media function 22, which may, for example, include access to Facebook®, Twitter®, Linked-In®

Figure 2:
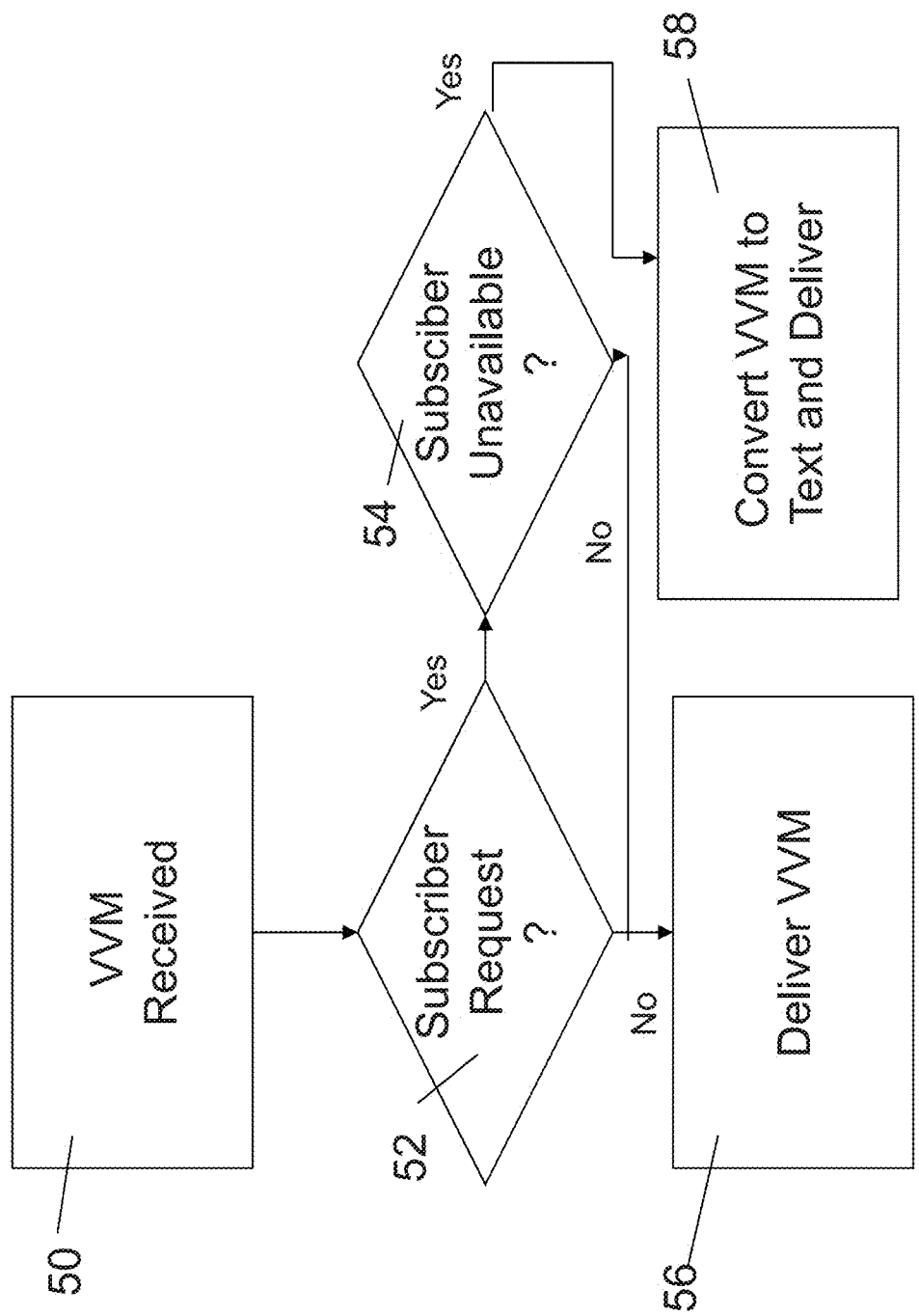
FIG. 2 is a flow chart is accordance with an embodiment of the disclosure.

In accordance with an embodiment, visual voice mail may be converted to text depending upon the parameters associated with the recipient's device. More specifically, this embodiment is directed to a profile that allows a subscriber to selectably convert voice mail to text when the subscriber is unavailable to listen to the voice mail. Voice mail to text conversion is based on a request and initiation of the subscriber by the subscriber adjusting his or her profile. Conversion may occur on the device. The profile may be updated via email, SMS, or any combination of known techniques. Thereafter, when a subscriber is unavailable to listen to a voice mail, the voice mail is converted to a text message. The subscriber may be unavailable because the subscriber's device is not capable of delivering a voice mail, the subscriber is in an area that may not accommodate a voice mail (e.g., library), or the like. The voice mail may be a visual voice mail or an audio only voice mail. In an example scenario, the subscriber activates the voice mail to text conversion. Activation can be via a button on the receiving device, a softkey, an audio command, a movement of the device, or the like. In accordance with FIG. 2, a visual voice mail is received at 50. At 52, a determination is made as to whether the subscriber has designated the visual voice mail be converted to text. If no, the visual voice mail is delivered at 56. If the subscriber has designated the conversion to text, a check is made at 54 to determine if the subscriber is unavailable. If yes, then the visual voice mail is converted to text and delivered at 58. If the subscriber is available at 54, then the visual voice mail is delivered at 56. Thus, while the subscriber is unavailable to listen to a voice mail message, the voice mail to text conversion becomes the alternative delivery method for voice mail to the subscriber until the subscriber's availability changes or the user preference setting changes.

Figure 3:
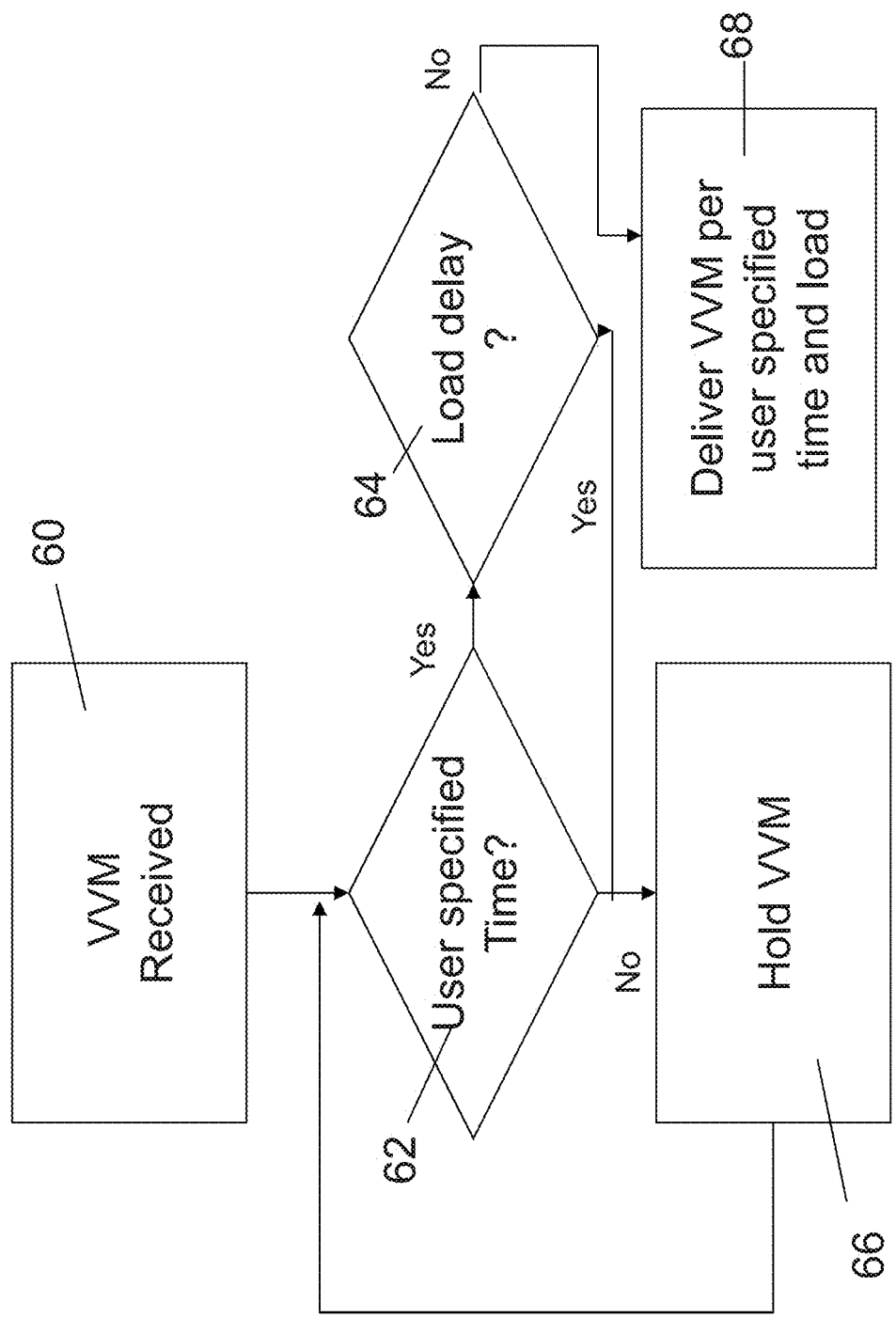
FIG. 3 is a flow chart in accordance with an alternative embodiment of the disclosure.

In accordance with a second embodiment, visual voice mail is delivered in accordance with a user programmable delay. More specifically, this embodiment is directed to load balancing via a user programmable delay of delivery of a voice mail message. A voice mail and/or text message converted from a voice mail can be delivered after a predetermined amount of time elapses. In an alternative configuration, the message may be delivered at any appropriate time within a window of time depending upon network availability. Thus, network load can be balanced during that window of time. For example, if a subscriber's profile indicates that the subscriber does not want to receive voice mail messages between midnight and 6:00 AM but will accept a delay based on network availability, the network may decide when to send the message(s) during the window when the subscriber is accepting voicemail deliveries. By way of example only and with reference to FIG. 3, a visual voice mail is received at 60. If the user has specified times for delivery at 62, then the network determines the load at 64 and delivers the visual voice mail at 68 when there is no network delay during the window allowed by the subscriber. If there is a network delay at 64, or if the time period is outside the time specified by the subscriber at 62, the visual voice mail is held for delivery and the process continues at 62.

An alternative to that example may be that the subscriber sets the profile to indicate that only condensed versions of the voice mail be sent during specified times. If a subscriber is busy or has a limited amount of time, the subscriber may activate a profile setting to provide or receive a condensed version of a full message. Accordingly, a limited version of a voice mail is delivered or sent such that a brief summary the message is delivered or received. Upon receiving the condensed version, a recipient may then request the full message. This option may be used in conjunction of the example set forth in FIG. 3 or independently of that embodiment.

Figure 4:
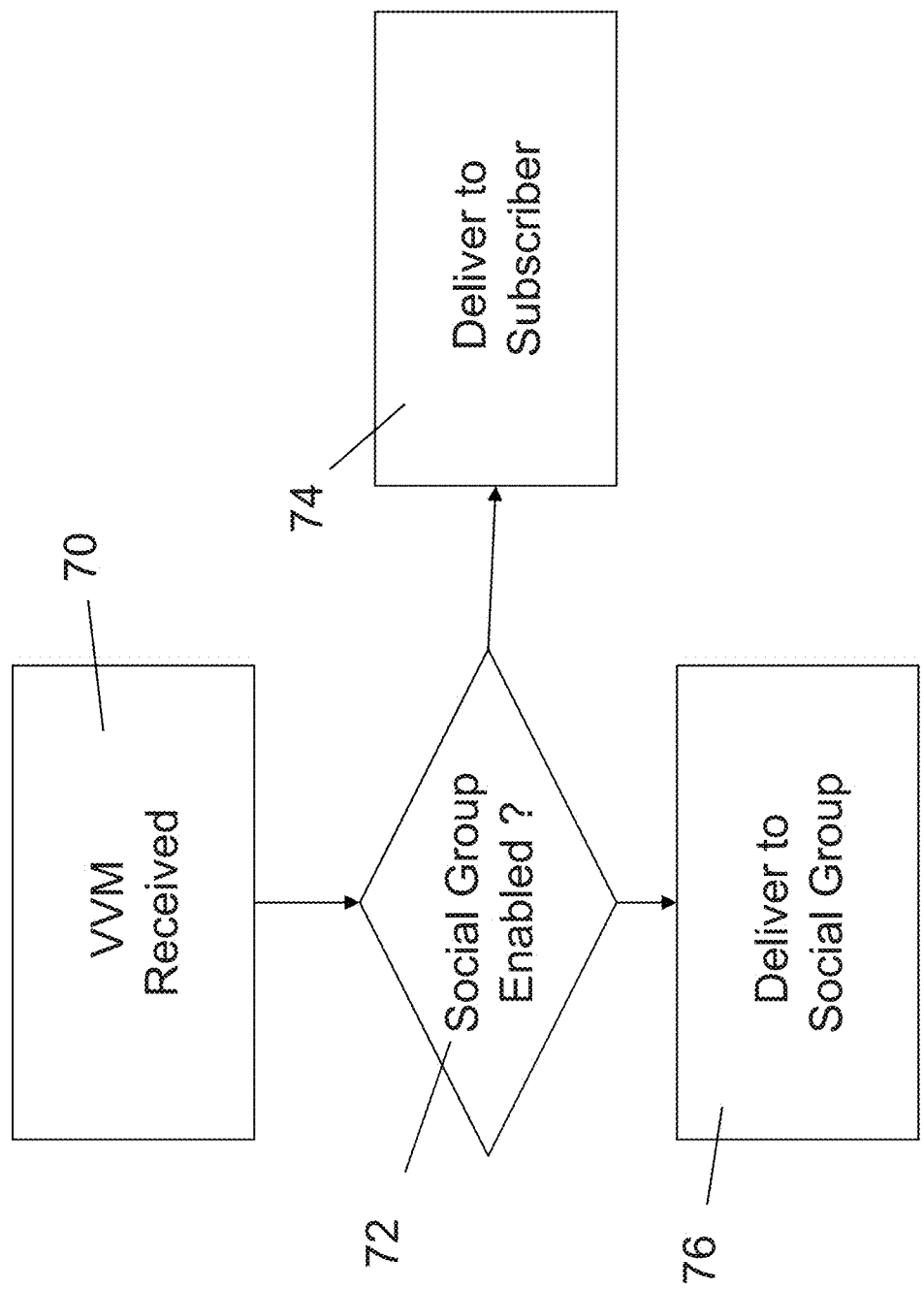
FIG. 4 is a flow chart in accordance with an alternative embodiment of the disclosure.

In accordance with a third embodiment, visual voice mail may be implemented within a social network. More specifically, this embodiment is directed to sharing a voice mail with authorized users within a social network. In an example configuration as set forth in FIG. 4, a visual voice mail is received at 70 by one subscriber in the social network. At 72, a determination is made as to whether the subscriber has enabled a social network group to receive the visual voice mail. If no, the visual voice mail is delivered to the subscriber at 74. If the subscriber has enabled the social network group to receive the visual voice mail, the message is automatically is delivered to the remaining list of recipients who have been accepted into a social network of the subscriber at 76. In a variation of this example, voice mails may be appended/concatenated with other voice mails within the social network.

Figure 5:
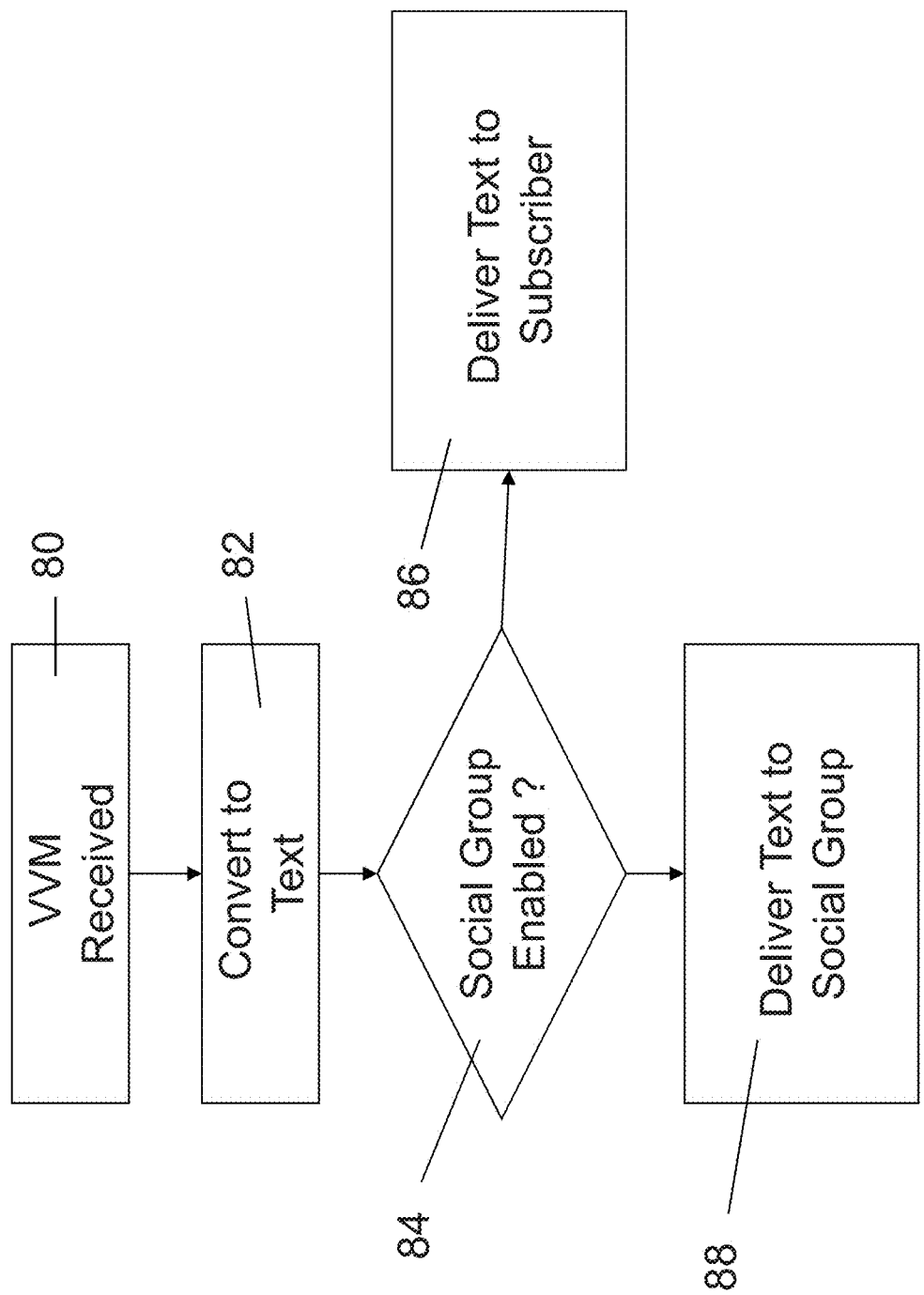
FIG. 5 is a flow chart in accordance with an alternative embodiment of the disclosure.

In accordance with a fourth embodiment and with reference to FIG. 5, visual voice mail is converted to text and implemented in a social network. A visual voice mail is received at 80 by one subscriber in the social network. At 82, the visual voice mail is converted to text. At 84, a determination is made as to whether the subscriber has enabled a social network group to receive the converted voice mail. If no, the converted voice mail is delivered to the subscriber at 89. If the subscriber has enabled the social network group to receive the converted visual voice mail, the message is automatically delivered to the remaining list of recipients who have been accepted into a social network of the subscriber at 88. In a variation of this example, voice mails may be appended/concatenated with other converted voice mails within the social network.

Figure 6:
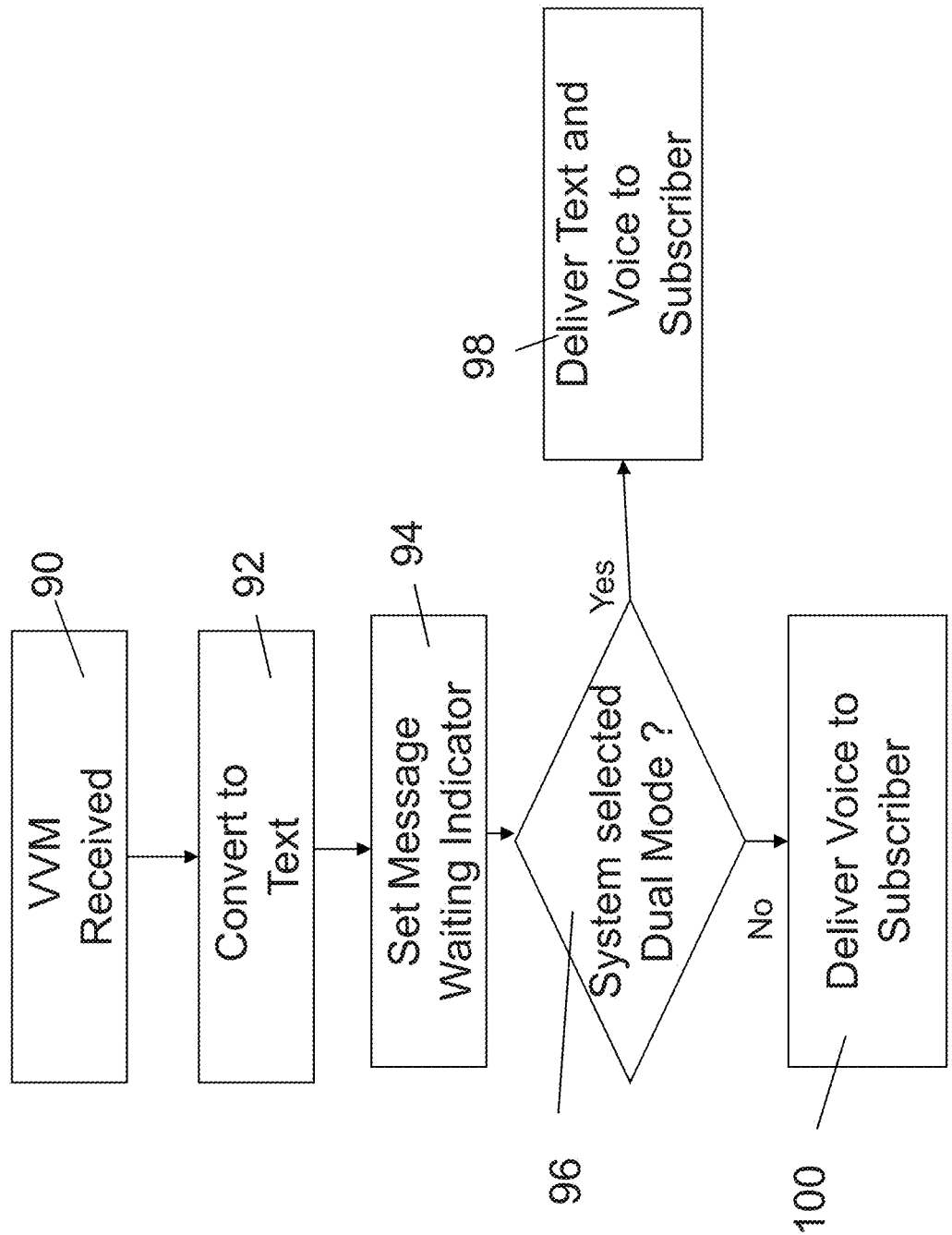
FIG. 6 is a flow chart in accordance with an alternative embodiment of the disclosure.

In accordance with a fifth embodiment and with reference to FIG. 6, a visual voice mail may be transcribed to text via a system switch. At 90, the visual voice mail server receives a new incoming voice message. At 92 the visual voice mail server transcribes the voice message to text. At 94, the visual voice mail server sends the message waiting notification indicator to the subscriber. The message waiting notification indicator also provides an interface to the system which informs allow the system to select and determine whether the subscriber desires to receive the text transcription together with the audio file, a determination which is made at 96. If the system indicates that the subscriber should receive both an audio file and a text file, then both audio and text are delivered at 98. If the system indicates that the subscriber should only receive a voice message, then the voice message is delivered at 100. The order of this exemplary embodiment may be altered such that the conversion to text only occurs after the dual mode is selected at 96.

Figure 7:
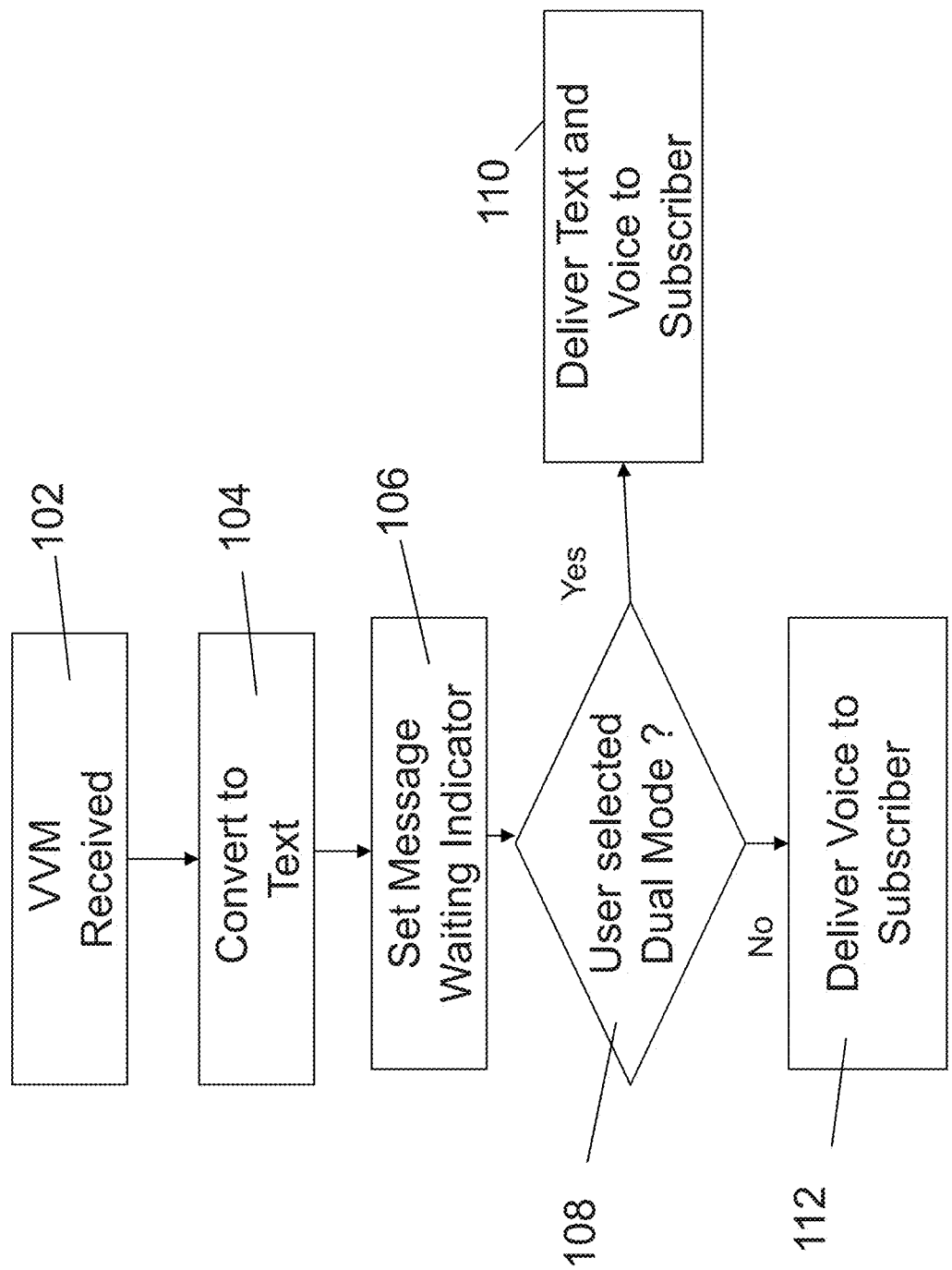
FIG. 7 is a flow chart in accordance with an alternative embodiment of the disclosure.

In accordance with a sixth embodiment and with reference to FIG. 7, a visual voice mail may be transcribed to text via a user selectable switch. At 102, the visual voice mail server receives a new incoming voice message. At 104 the visual voice mail server transcribes the voice message to text. At 106, the visual voice mail server sends the message waiting notification indicator to the subscriber. The message waiting notification indicator also provides the opportunity for the subscriber to select and determine whether the subscriber desires to receive the text transcription together with the audio file, a determination which is made at 108. If the subscriber indicates that the subscriber should receive both an audio file and a text file, then both audio and text are delivered at 110. If the subscriber indicates that the subscriber should only receive a voice message, then only the voice message is delivered at 112. The order of this exemplary embodiment may be altered such that the conversion to text only occurs after the dual mode is selected at 108.

Figure 8:
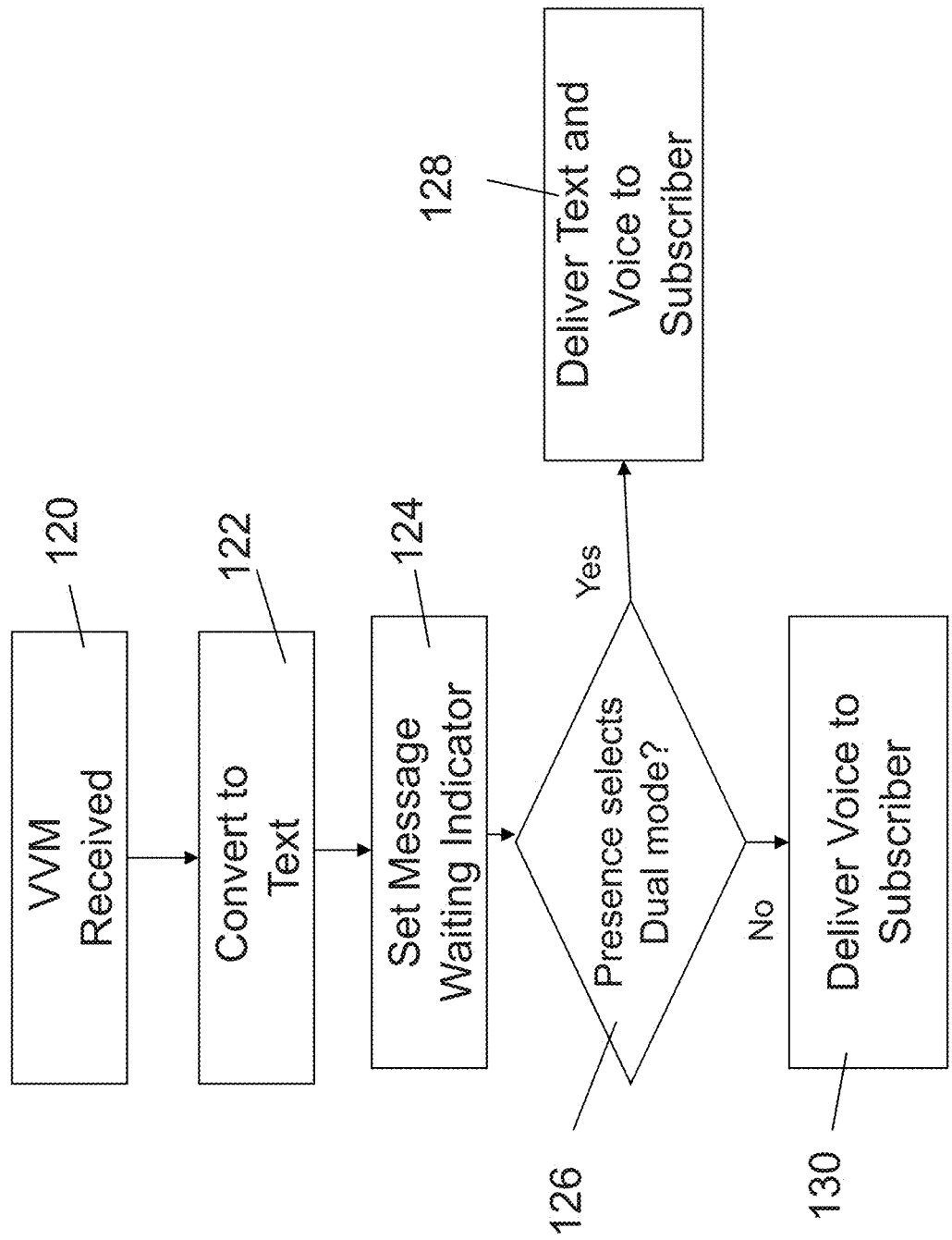
FIG. 8 is a flow chart in accordance with an alternative embodiment of the disclosure.

In accordance with a seventh embodiment and with reference to FIG. 8, a visual voice mail may be transcribed to text via a subscriber's presence. At 120, the visual voice mail server receives a new incoming voice message. At 122 the visual voice mail server transcribes the voice message to text. At 124, the visual voice mail server sends the message waiting notification indicator to the subscriber. The message waiting notification indicator also provides an interface to a presence server to determine whether the subscriber's presence indicates that the subscriber should receive the text transcription together with the audio file, a determination which is made at 126. If the presence server indicates that the subscriber should receive both an audio file and a text file, then both audio and text are delivered at 128. If the presence server indicates that the subscriber should only receive a voice message, then only the voice message is delivered at 130. The order of this exemplary embodiment may be altered such that the conversion to text only occurs after the dual mode is selected at 126.

Figure 9:
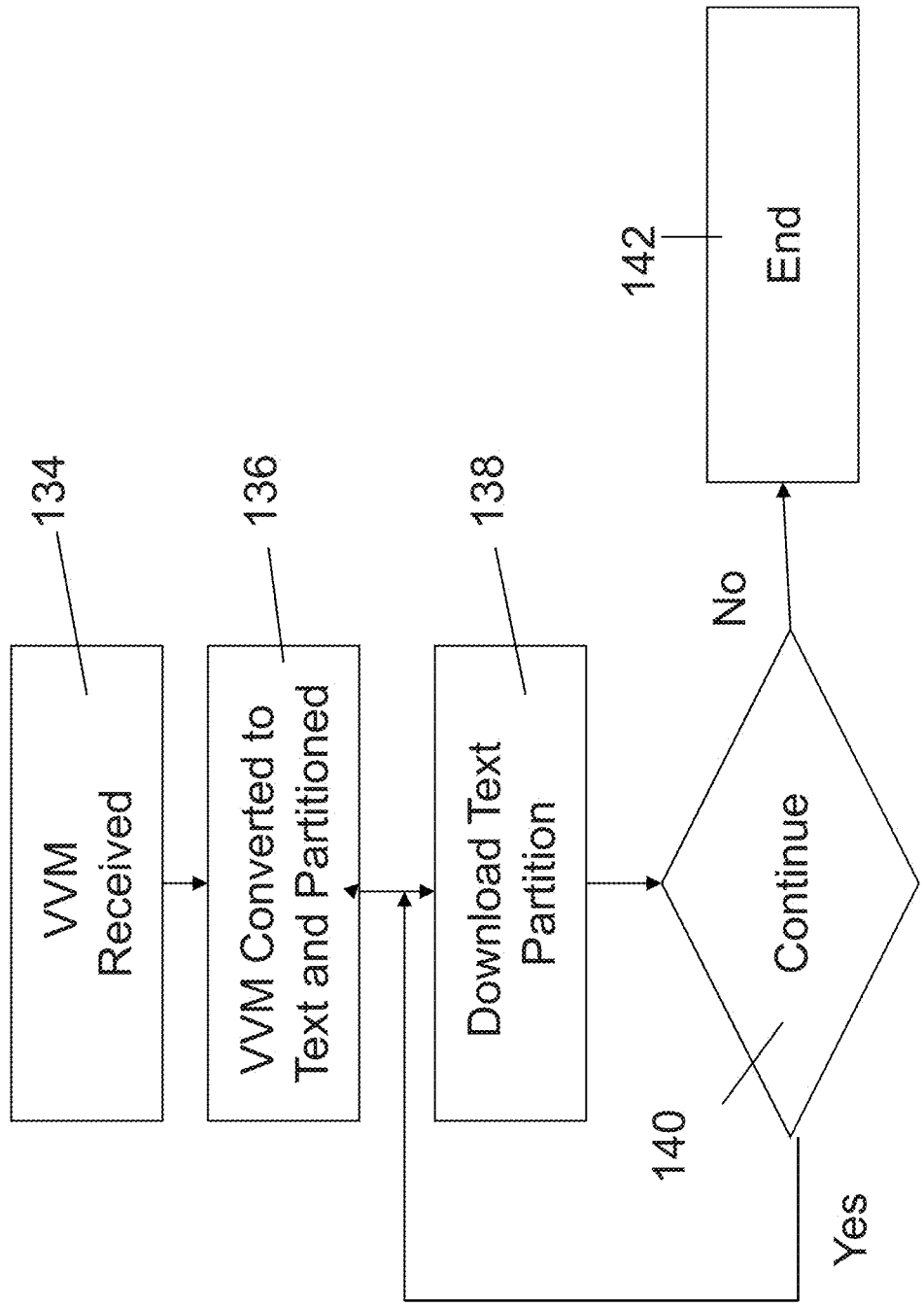
FIG. 9 is a flow chart in accordance with an alternative embodiment of the disclosure.

In accordance with an eighth embodiment and with reference to FIG. 9, the visual voice mail may be partitioned into multiple text data flows and delivered incrementally at the request of the subscriber. Each individual data flow of text transcription includes an individual segment of the voice message. This allows the recipient to receive and read the text transcription message incrementally based on whether the text transcription message is of interest to the subscriber. At 134, the visual voice mail is received. At 136, the visual voice mail is converted to text and partitioned into individual data flows. At 138, a partition is downloaded via text message to the subscriber. At 140, the subscriber determines whether to continue receiving the text message with the next subsequent partitioned data flow. If the subscriber desires to continue, then 138 is repeated. If the subscriber does not wish to continue or if the last data flow has been delivered, the process stops at 142.

Figure 10:
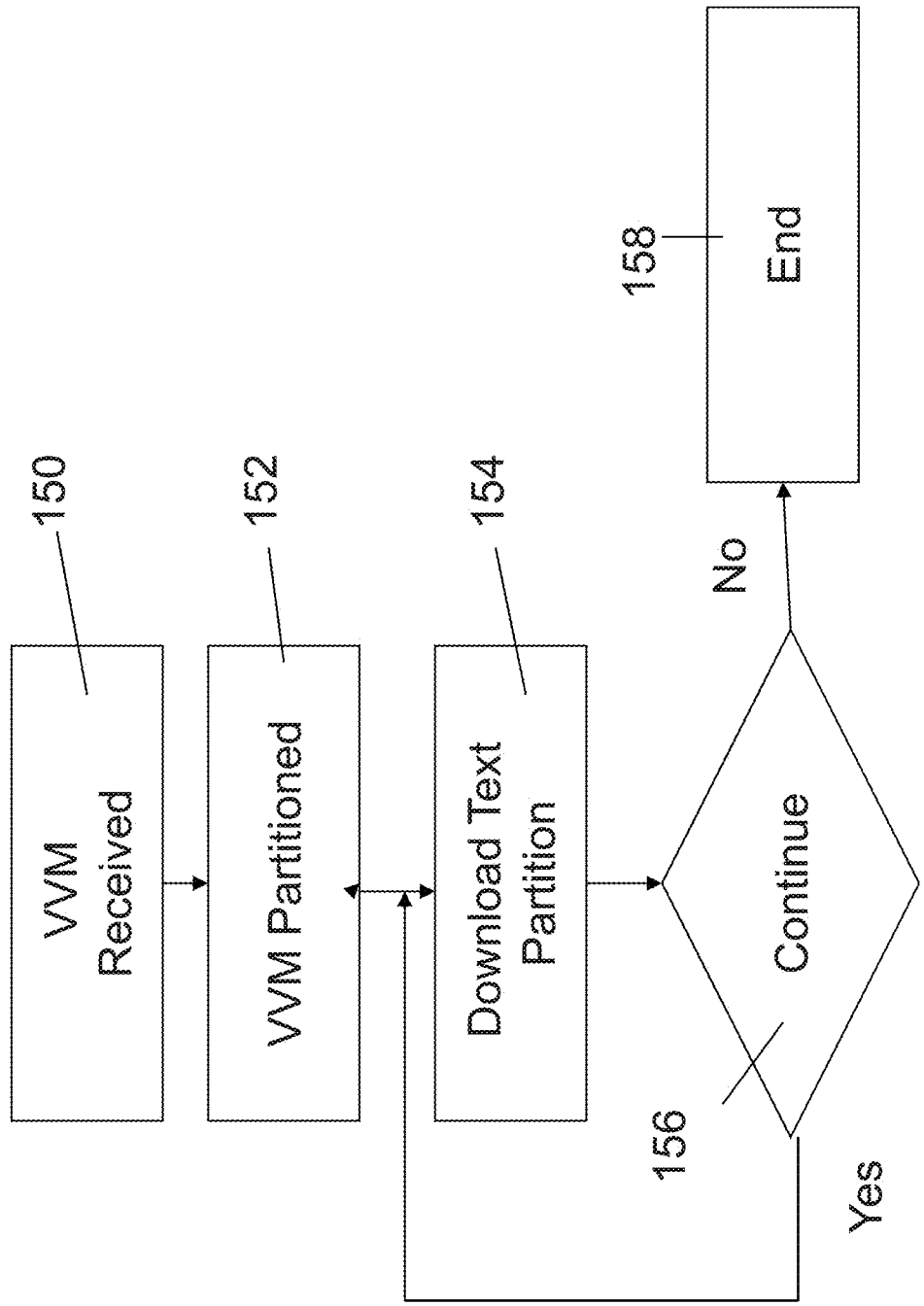
FIG. 10 is a flow chart in accordance with an alternative embodiment of the disclosure.

In accordance with a ninth embodiment and with reference to FIG. 10, the visual voice mail may be partitioned into multiple voice flows and delivered incrementally at the request of the subscriber. Each voice flow includes an individual segment of the voice message. This allows the recipient to listen to the message incrementally based on whether the message is of interest to the subscriber. At 150, the visual voice mail is received. At 152 the visual voice mail is partitioned into individual data flows. At 154 a voice partition is downloaded to the subscriber. At 156, the subscriber determines whether to continue receiving the voice message with the next subsequent partitioned voice flow. If the subscriber desires to continue, then 154 is repeated. If the subscriber does not wish to continue or if the last voice flow has been delivered, the process stops at 158.

Figure 11:
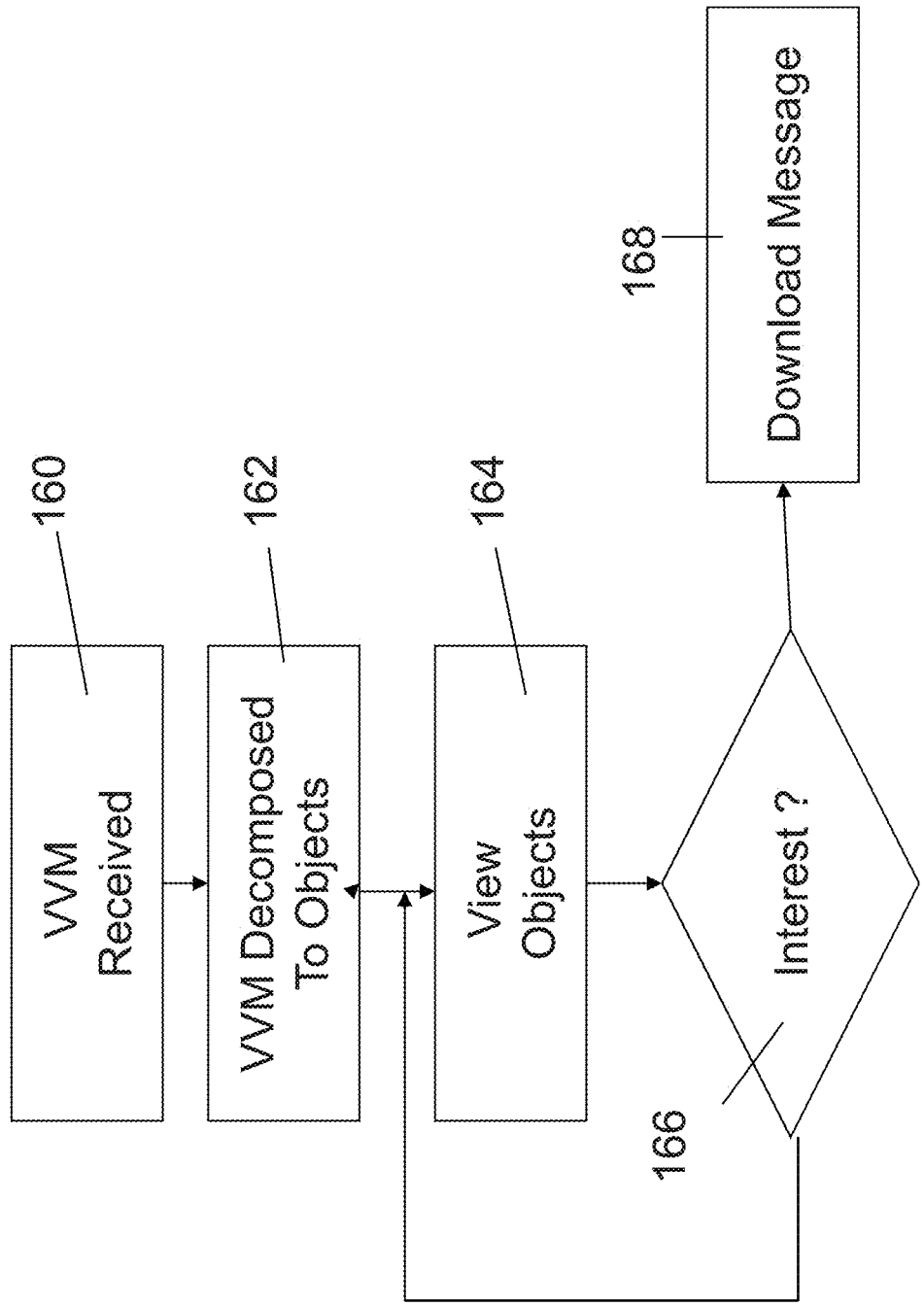
FIG. 11 is a flow chart in accordance with an alternative embodiment of the disclosure.
Figure 12:
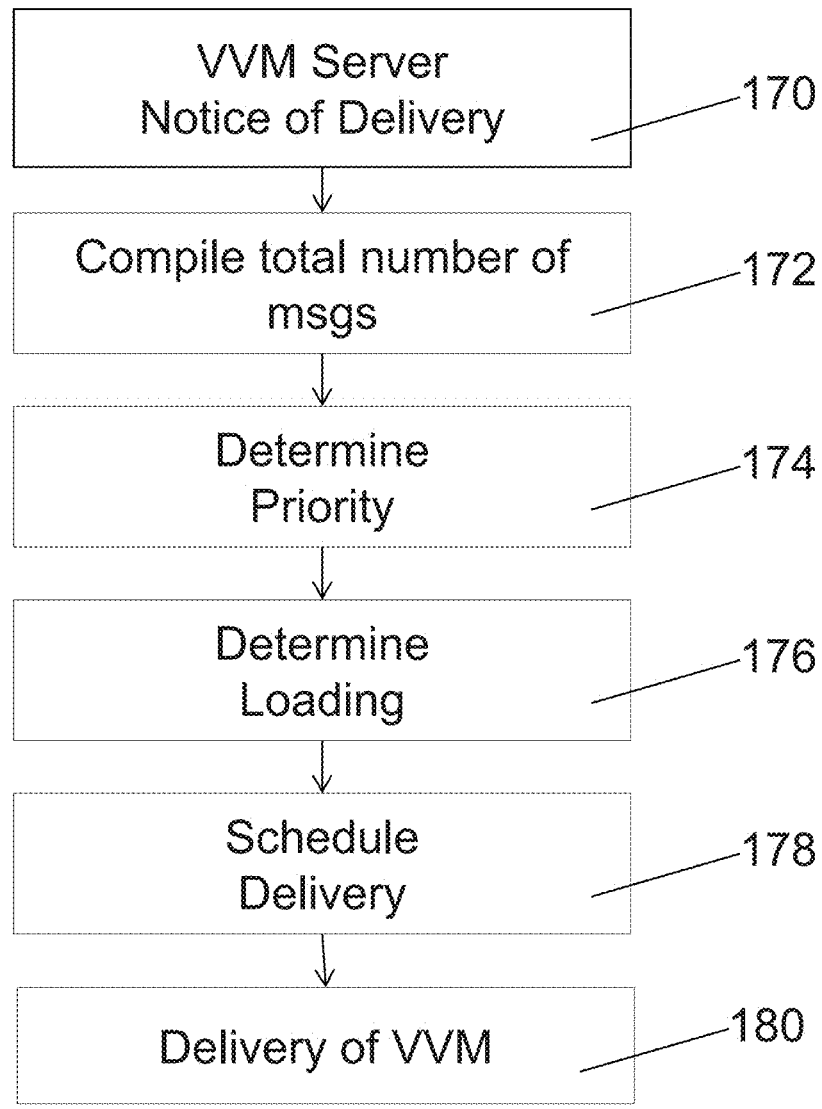
FIG. 12 is a flow chart in accordance with an alternative embodiment of the disclosure.

In accordance with a tenth embodiment and with reference to FIG. 11, the visual voice mail may be decomposed into objects which are viewed prior to downloading. This allows the recipient to view the objects according to a class-based paradigm, which may, for example, be a subject of interest such as a birthday party, a hobby, or any other type of classification. At 160, the visual voice mail is received. At 162 the visual voice mail is decomposed into one or more objects. At 164 one or more objects are presented to the subscriber. At 166, the subscriber determines whether any of the objects are of interest. If the subscriber determines there in an object of interest, that voice message is downloaded from the server, either via voice or through a text conversion. If the subscriber does not see an object of interest at 166, then the process continues with the viewing of additional objects, if any In yet another embodiment and with reference to FIG. 12, the visual voice mail is delivered via push mailbox messaging. The push mechanism may be scheduled in accordance with a priority as determined by the subscriber or based on traffic conditions. At 170, the visual voice mail service receives notification that the received messages are to be deposited into a subscriber mailbox. At 172, the visual voice mail server reviews the total volume of messages to be delivered. At 174, the visual voice mail server determines the priority of each message as determined by the subscriber. For example, the subscriber may prioritize messages based on the caller, for example, a family member, spouse, a boss or a customer. The subscriber may indicate priority by developing a profile based on calling party identification. Alternatively, the subscriber may indicate priority based on age of the messages (i.e., newer messages delivered first or last) or based on the time of day each message was received. At 176, the visual voice mail server determines the loading of the network. At 178, the visual voice mail server schedules the order of delivery based on the subscriber-identified priority and network loading. At 180, the visual voice mail is pushed to the subscriber's mailbox in accordance with the priority.

In accordance with yet another embodiment, the visual voice mail may be delivered via an long term evolution ('LTE') system, which may, for example, include a virtual channel connection to the visual voice mail server. The embodiment, may, for example, include a circuit switched/packet switched handover. The circuit switched voice call may be maintained through a handover using a virtual channel connection which allows the packet switched network to retrieve the visual voice mail from the visual voice mail server. The circuit switched call may, for example, be a multi-party call to enable multiple parties to share, annotate or discuss the visual voice mail content or the text conversion thereof. The visual voice mail and/or text translation may be delivered via the packet switched network, for example, the GGSN, or the IMS, depending on availability.

Figure 13:
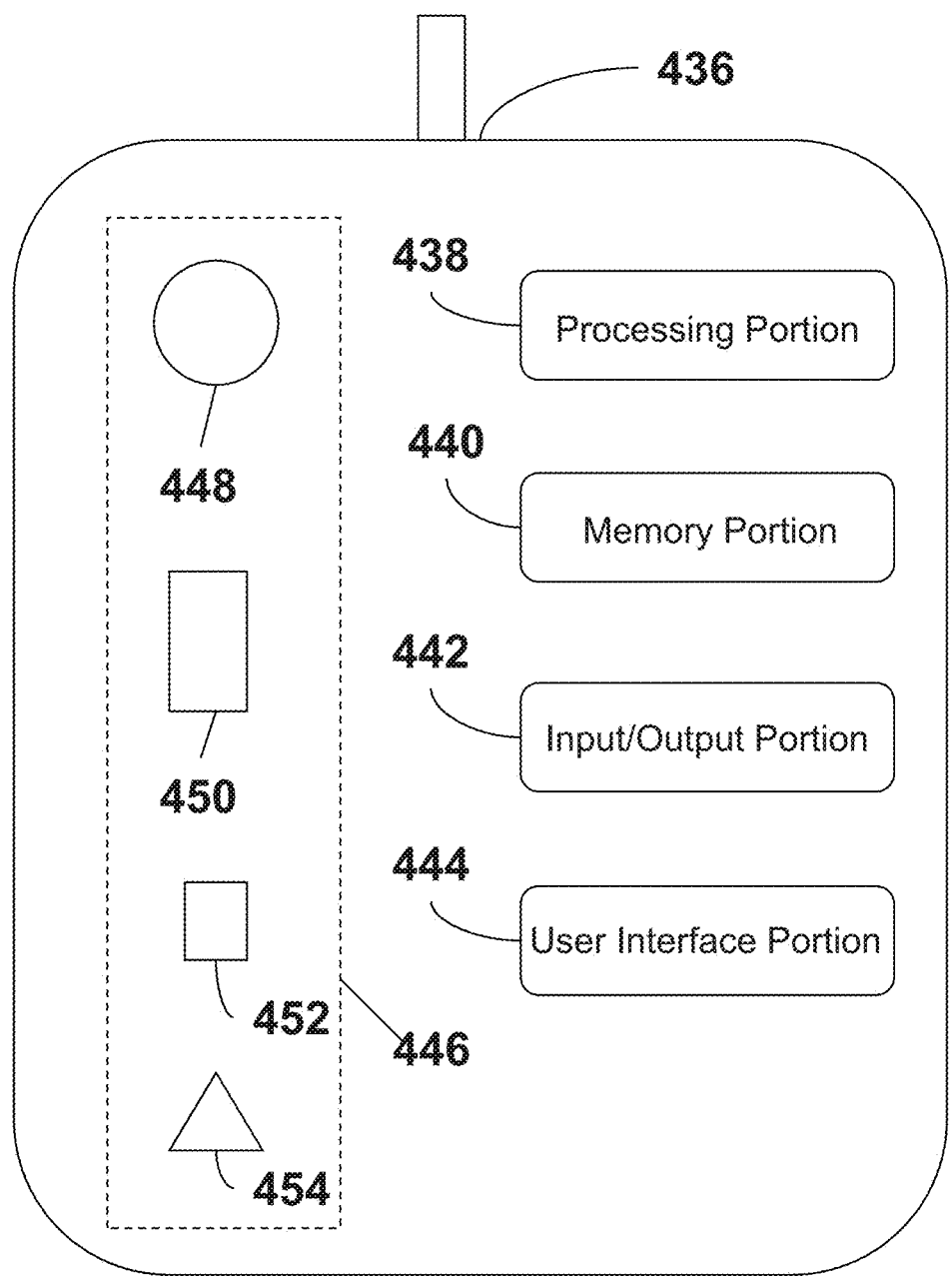
FIG. 13 is a block diagram of an example device that is configurable to be compatible with visual voice mail systems.

FIG. 13 is a block diagram of an example device 436 that may, for example be a smartphone or other mobile device and which is configurable to receive voice mail. The device 436 can include any appropriate device, mechanism, software, and/or hardware for distributing connectivity and/or transmission time as described herein. As described herein, the device 436 comprises hardware, or a combination of hardware and software. And, each portion of the device 436 comprises hardware, or a combination of hardware and software. In an example configuration, the device 436 can comprise a processing portion 438, a memory portion 440, an input/output portion 442, a user interface (UI) portion 444, and a sensor portion 446 comprising at least one of a video camera portion 448, a force/wave sensor 450, a microphone 452, a moisture sensor 454, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 54 is capable of detecting moisture, such as detecting if the device 436 is submerged in a liquid. The processing portion 438, memory portion 440, input/output portion 442, user interface (UI) portion 444, video camera portion 448, force/wave sensor 450, and microphone 452 are coupled together to allow communications therebetween (coupling not shown in FIG. 13).

In various embodiments, the input/output portion 442 comprises a receiver of the device 436, a transmitter of the device 436, or a combination thereof. The input/output portion 442 is capable of receiving and/or providing information pertaining to visual voice mail messages as described herein or other communications with other devices and device types. For example, the input/output portion 442 can include a wireless communications (e.g., 2.5G/3G/4G) SIM card. The input/output portion 442 is capable of receiving and/or sending text information, video information, audio information, control information, image information, data, an indication to initiate a connection, an indication to initiate a transmission, start time information, end time information, interval time information, interval length information, random number value information, connect time information, transmit time information, parsing information, authentication information, or any combination thereof. In an example configuration, the input\output portion 442 comprises a GPS receiver. In an example configuration, the device 36 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 442 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 438 is capable of processing voice mail as described herein. The processing portion 438, in conjunction with any other portion of the device 436, enables the device 436 to covert speech to text or convert text to speech.

In a basic configuration, the device 436 can include at least one memory portion 440. The memory portion 440 can store any information utilized in conjunction with voice mail as described herein. Depending upon the exact configuration and type of processor, the memory portion 40 can be volatile (such as some types of RAM), non-volatile (such as ROM, flash memory, etc.). The device 436 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 440, or a portion of the memory portion 440 is hardened such that information stored therein can be recovered if the device 436 is exposed to extreme heat, extreme vibration, extreme moisture, corrosive chemicals or gas, or the like. In an example configuration, the information stored in the hardened portion of the memory portion 440 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 440 intelligible.

The device 436 also can contain a UI portion 444 allowing a user to communicate with the device 436. The UI portion 444 is capable of rendering any information utilized in conjunction the visual voice mail as described herein. For example, the UI portion 444 can provide means for entering text (including numbers), entering a phone number, rendering text, rendering images, rendering multimedia, rendering sound, rendering video, receiving sound, or the like, as described herein. The UI portion 444 can provide the ability to control the device 436, via, for example, buttons, soft keys, voice actuated controls, a touch screen, movement of the device 436, visual cues (e.g., moving a hand in front of a camera on the mobile device 436), or the like. The UI portion 444 can provide visual information (e.g., via a display), audio information (e.g., via speaker), mechanically (e.g., via a vibrating mechanism), or a combination thereof. In various configurations, the UI portion 444 can comprise a display, a touch screen, a keyboard, a speaker, or any combination thereof. The UI portion 444 can comprise means for inputting biometric information, such as, for example, fingerprint information, retinal information, voice information, and/or facial characteristic information. The UI portion 444 can be utilized to enter an indication of the designated destination (e.g., the phone number, IP address, or the like).

In an example embodiment, the sensor portion 446 of the device 436 comprises the video camera portion 448, the force/wave sensor 450, and the microphone 452. The video camera portion 448 comprises a camera (or cameras) and associated equipment capable of capturing still images and/or video and to provide the captured still images and/or video to other portions of the device 436. In an example embodiment, the force/wave sensor 450 comprises an accelerometer, a tilt sensor, an acoustic sensor capable of sensing acoustic energy, an optical sensor (e.g., infrared), or any combination thereof.

Figure 14:
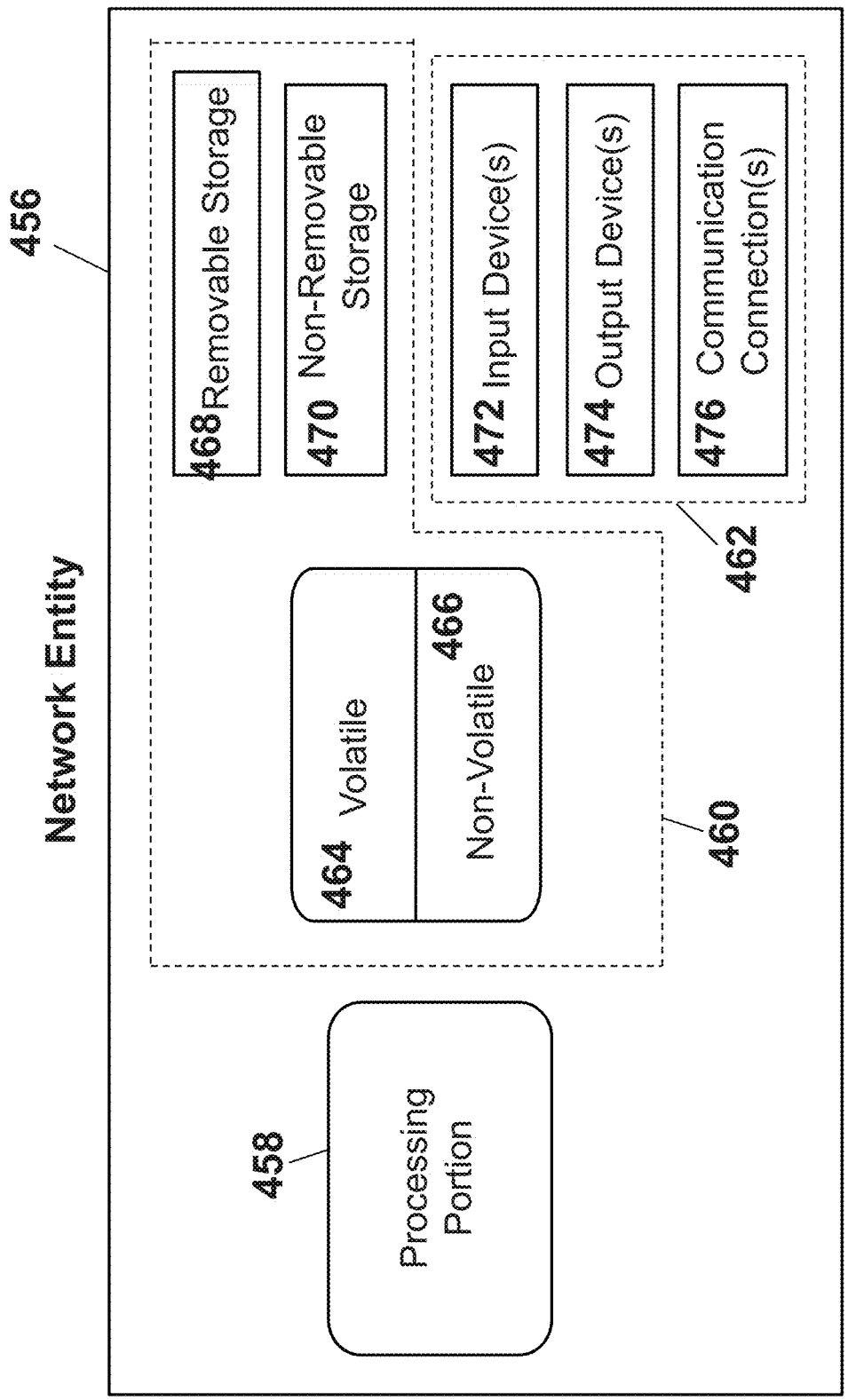
FIG. 14 is a block diagram of an example network entity configurable to be compatible with visual voice mail systems.

FIG. 14 is a block diagram of an example network entity 456 such as a smart phone configurable to facilitate a visual voice mail system as described herein. In an example embodiment, the network entity 456 comprises a network entity comprising hardware, or a combination of hardware and software. And, each portion of the network entity 456 comprises hardware, or a combination of hardware and software. When used in conjunction with a network, the functionality needed to facilitate visual voice mail processing may reside in any one or combination of network entities. The network entity 456 represents any appropriate network entity, apparatus, or combination of network entities or apparatuses, such as a processor, a server, a gateway, etc., or any combination thereof. It is emphasized that the block diagram depicted in FIG. 14 is exemplary and not intended to imply a specific implementation or configuration. Thus, the network entity 456 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 456 comprises a processing portion 458, a memory portion 460, and an input/output portion 462. The processing portion 458, memory portion 460, and input/output portion 462 are coupled together (coupling not shown in FIG. 14) to allow communications therebetween. The input/output portion 462 is capable of receiving and/or providing information from/to a device (e.g. device 436) and/or other network entity configured to be utilized in conjunction with visual voice mail services. For example, the input/output portion 462 is capable of, in conjunction with any other portion of the network entity 456 as needed, receiving and/or sending text information, video information, audio information, control information, image information, data, or any information relating to visual voice mail, or any combination thereof.

The processing portion 458 is capable of performing functions associated with distributing connectivity and/or transmission time, as described herein. For example, the processing portion 458 is capable of, in conjunction with any other portion of the network entity 456 as needed, executing an application for processing visual voice mail via the user interface portion 444, processing text messages received via the input/output portion 442, processing voice messages received via the input/output portion 442, or the like, or any combination thereof.

The memory portion 460 can store any information utilized in conjunction with visual voice mail, as described herein. For example, the memory portion 460 is capable of storing information pertaining to a start time, an end time, an interval time, a random number value, a connect time, a transmission time, parsing information, authenticating information, hashing information, encrypting information, a location of a device, a predetermined text/voice message, a text/voice message, a predetermined audio/text message, an audio/text message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of network entity 456, the memory portion 460 can include a computer storage medium, or media, that is volatile 464 (such as dynamic RAM), non-volatile 466 (such as ROM), or a combination thereof. The network entity 456 can include additional storage, in the form of computer storage media (e.g., removable storage 468 and/or non-removable storage 470) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The network entity 456 also can contain communications connection(s) 476 that allow the network entity 456 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The network entity 456 also can include input device(s) 472 such as keyboard, mouse, pen, voice input device, touch input device, an optical input device, etc. Output device(s) 474 such as a display, speakers, printer, mechanical vibrators, etc. also can be included.

The communications device (e.g., device 436) and the network entity (network entity 456) can be part of and/or in communication with various wireless communications networks. Some of which are described below.

Figure 15:
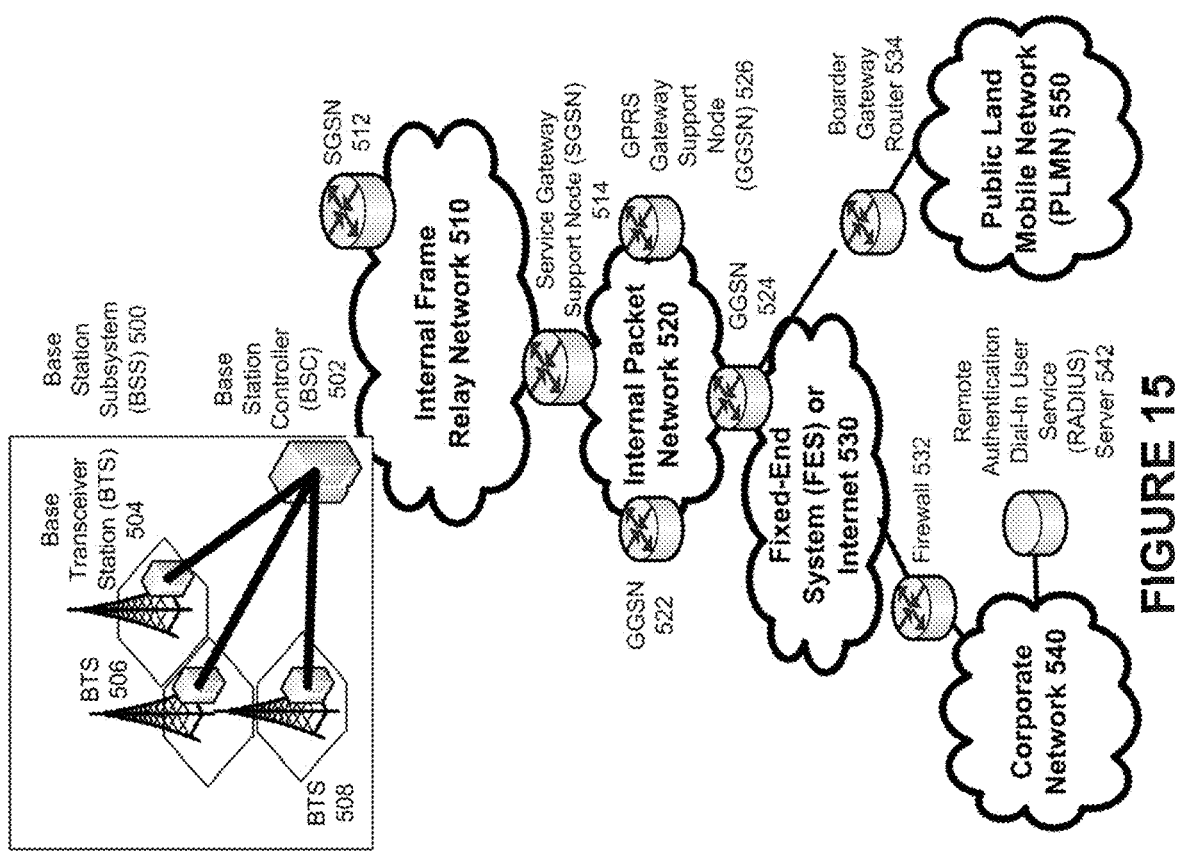
FIG. 15 depicts an overall block diagram of an exemplary packet-based mobile cellular network environment, such as a GPRS network, in which visual voice mail systems can be implemented.

FIG. 15 depicts an overall block diagram of an exemplary packet-based mobile cellular network environment, such as a GPRS network, in which visual voice mail may be implemented. In the exemplary packet-based mobile cellular network environment, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices become connected to the wireless network. In exemplary fashion, the packet traffic originating from user devices is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 may be connected to GGSN 524 via firewall 532; and PLMN 550 is connected to GGSN 524 via boarder gateway router 534. The Remote Authentication Dial-In User Service ("RADIUS") server 542 may be used for caller authentication when a user of a mobile cellular device calls corporate network 540.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 16:
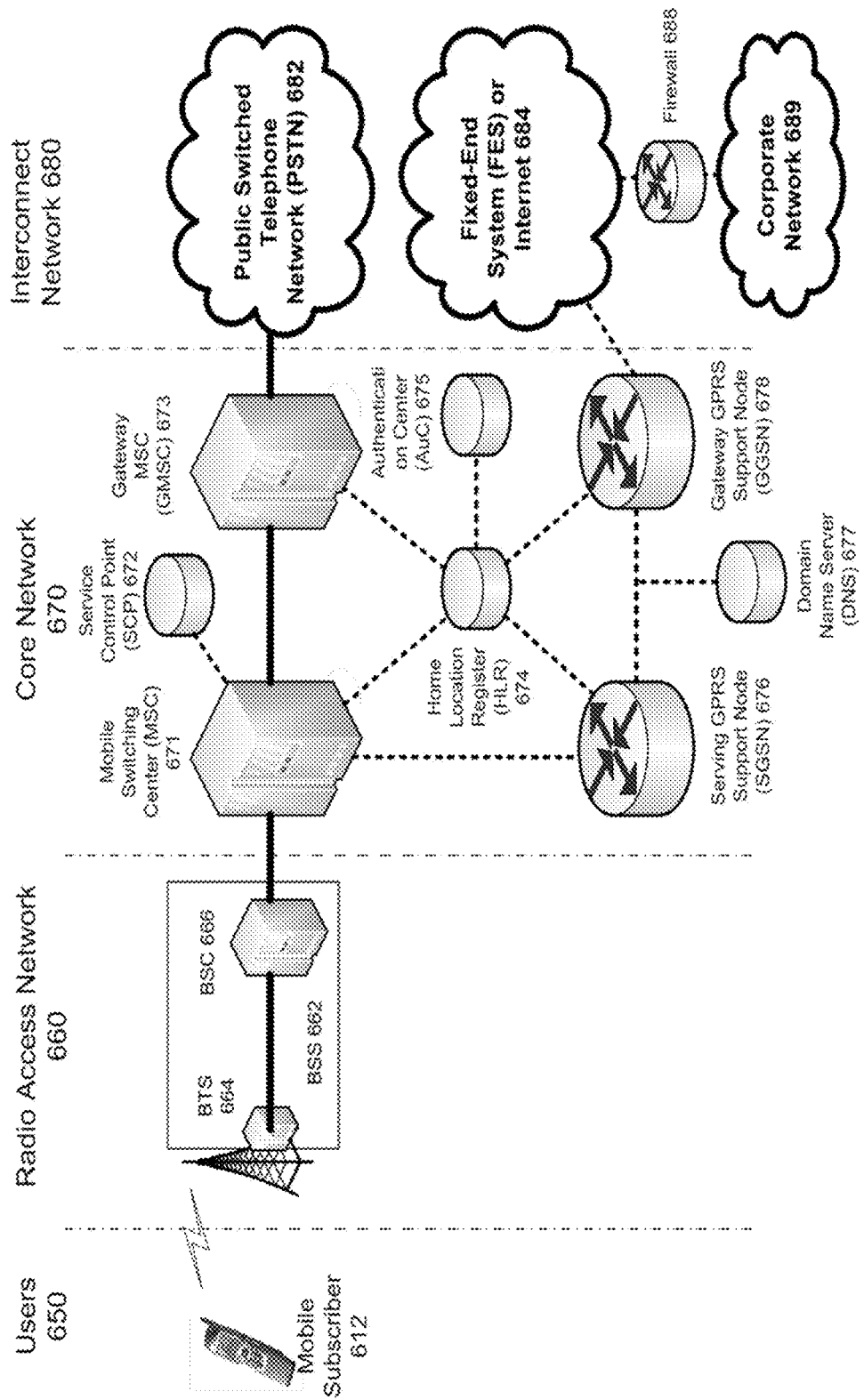
FIG. 16 illustrates architecture of a typical GPRS network in which visual voice mail systems can be implemented.

FIG. 16 illustrates an architecture of a typical GPRS network in which visual voice mail can be implemented. The architecture depicted in FIG. 16 is segmented into four groups: users 650, radio access network 660, core network 670, and interconnect network 680. Users 650 comprise a plurality of end users. Note, device 612 is referred to as a mobile subscriber in the description of network shown in FIG. 16. In an example embodiment, the device depicted as mobile subscriber 612 comprises a communications device (e.g., wireless anti-theft security M2M type device 36). Radio access network 660 comprises a plurality of base station subsystems such as BSSs 662, which include BTSs 664 and BSCs 666. Core network 670 comprises a host of various network elements. As illustrated in FIG. 16, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 16, interconnect network 680 comprises Public Switched Telephone Network ("PSTN") 682, Fixed-End System ("FES") or Internet 684, firewall 688, and Corporate Network 689.

A mobile switching center can be connected to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which then sends the data traffic to GGSN 678 for further forwarding.

When MSC 671 receives call traffic, for example, from BSC 666, it sends a query to a database hosted by SCP 672. The SCP 672 processes the request and issues a response to MSC 671 so that it may continue call processing as appropriate.

The HLR 674 is a centralized database for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC

675. AuC 675 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. When mobile subscriber 612 initiates the attach process by turning on the network capabilities of the mobile device, an attach request is sent by mobile subscriber 612 to SGSN 676. The SGSN 676 queries another SGSN, to which mobile subscriber 612 was attached before, for the identity of mobile subscriber 612. Upon receiving the identity of mobile subscriber 612 from the other SGSN, SGSN 676 requests more information from mobile subscriber 612. This information is used to authenticate mobile subscriber 612 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 612 was attached before, to cancel the location process for mobile subscriber 612. HLR 674 then notifies SGSN 676 that the location update has been performed. At this time, SGSN 676 sends an Attach Accept message to mobile subscriber 612, which in turn sends an Attach Complete message to SGSN 676.

After attaching itself with the network, mobile subscriber 612 then goes through the authentication process. In the authentication process, SGSN 676 sends the authentication information to HLR 674, which sends information back to SGSN 676 based on the user profile that was part of the user's initial setup. The SGSN 676 then sends a request for authentication and ciphering to mobile subscriber 612. The mobile subscriber 612 uses an algorithm to send the user identification (ID) and password to SGSN 676. The SGSN 676 uses the same algorithm and compares the result. If a match occurs, SGSN 676 authenticates mobile subscriber 612.

Next, the mobile subscriber 612 establishes a user session with the destination network, corporate network 689, by going through a Packet Data Protocol ("PDP") activation process. Briefly, in the process, mobile subscriber 612 requests access to the Access Point Name ("APN"), for example, UPS.com, and SGSN 676 receives the activation request from mobile subscriber 612. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 612.

Once activated, data packets of the call made by mobile subscriber 612 can then go through radio access network 660, core network 670, and interconnect network 680, in a particular fixed-end system or Internet 684 and firewall 688, to reach corporate network 689.

Figure 17:
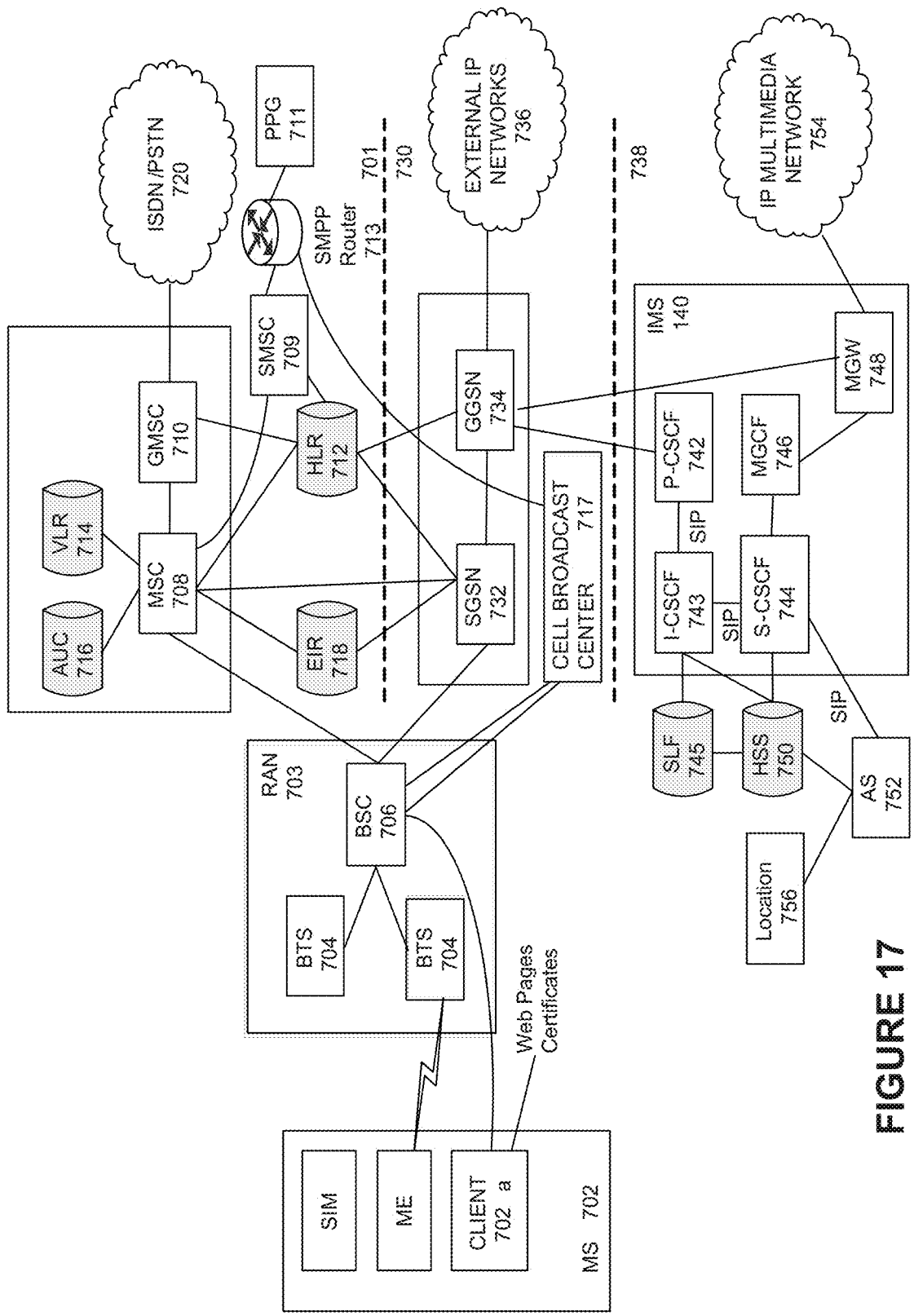
FIG. 17 illustrates an exemplary block diagram view of a GSM/GPRS/IP multimedia network architecture within which visual voice mail systems can be implemented.

FIG. 17 illustrates an exemplary block diagram view of a GSM/GPRS/IP multimedia network architecture within which visual voice mail systems can be implemented. As illustrated, the architecture of FIG. 17 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. Thus, the GMSC 710 provides interworking functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 717 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 738 was introduced with 3GPP Release 7, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743, forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 18:
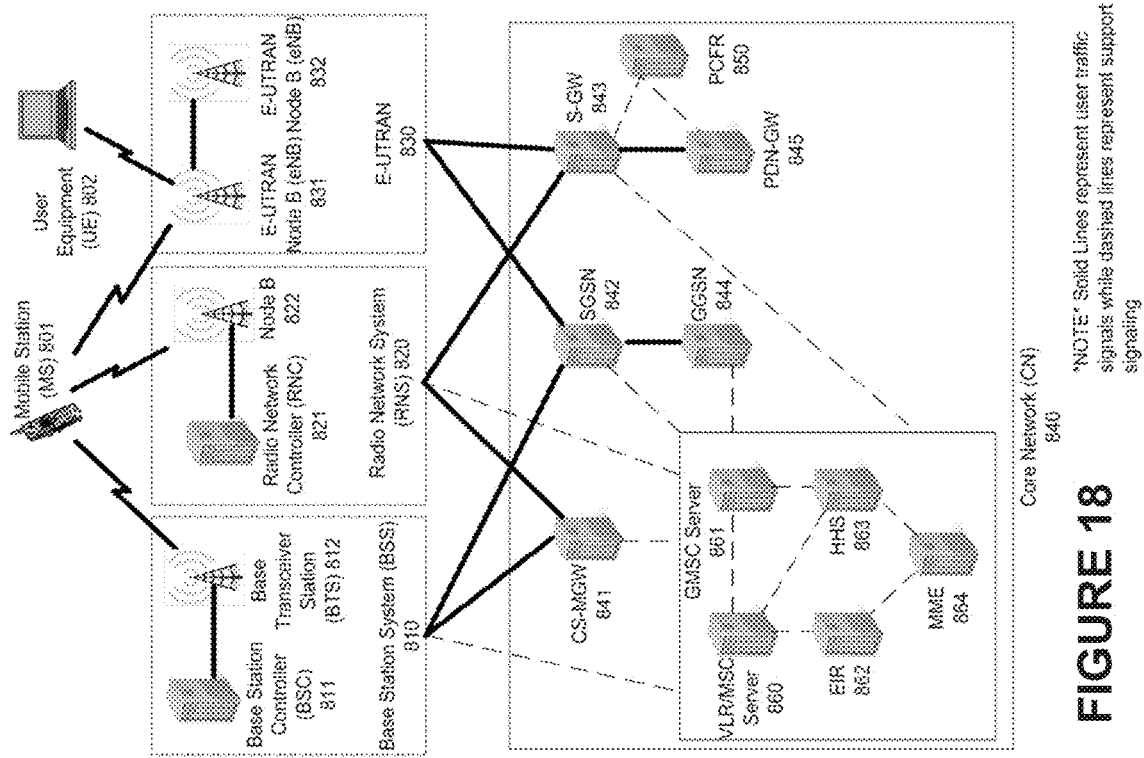
FIG. 18 illustrates a PLMN block diagram view of an exemplary architecture in which visual voice mail systems may be incorporated.

FIG. 18 illustrates a PLMN block diagram view of an exemplary architecture in which visual voice mail systems may be incorporated. Mobile Station (MS) 801 is the physical equipment used by the PLMN subscriber. In one illustrative embodiment, communications device 436 may serve as Mobile Station 801. Mobile Station 801 may be one of, but not limited to, a cellular telephone, a cellular telephone in combination with another electronic device or any other wireless mobile communication device.

Mobile Station 801 may communicate wirelessly with Base Station System (BSS) 810. BSS 810 contains a Base Station Controller (BSC) 811 and a Base Transceiver Station (BTS) 812. BSS 810 may include a single BSC 811/BTS 812 pair (Base Station) or a system of BSC/BTS pairs which are part of a larger network. BSS 810 is responsible for communicating with Mobile Station 801 and may support one or more cells. BSS 810 is responsible for handling cellular traffic and signaling between Mobile Station 801 and Core Network 840. Typically, BSS 810 performs functions that include, but are not limited to, digital conversion of speech channels, allocation of channels to mobile devices, paging, and transmission/reception of cellular signals.

Additionally, Mobile Station 801 may communicate wirelessly with Radio Network System (RNS) 820. RNS 820 contains a Radio Network Controller (RNC) 821 and one or more Node(s) B 822. RNS 820 may support one or more cells. RNS 820 may also include one or more RNC 821/Node B 822 pairs or alternatively a single RNC 821 may manage multiple Nodes B 822. RNS 820 is responsible for communicating with Mobile Station 801 in its geographically defined area. RNC 821 is responsible for controlling the Node(s) B 822 that are connected to it and is a control element in a UMTS radio access network. RNC 821 performs functions such as, but not limited to, load control, packet scheduling, handover control, security functions, as well as controlling Mobile Station 801's access to the Core Network (CN) 840.

The evolved UMTS Terrestrial Radio Access Network (E-UTRAN) 830 is a radio access network that provides wireless data communications for Mobile Station 801 and User Equipment 802. E-UTRAN 830 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 830 may include of series of logical network components such as E-UTRAN Node B (eNB) 831 and E-UTRAN Node B (eNB) 832. E-UTRAN 830 may contain one or more eNBs. User Equipment 802 may be any user device capable of connecting to E-UTRAN 830 including, but not limited to, a personal computer, laptop, mobile device, wireless router, or other device capable of wireless connectivity to E-UTRAN 830. The improved performance of the E-UTRAN 830 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 801 may communicate with any or all of BSS 810, RNS 820, or E-UTRAN 830. In a illustrative system, each of BSS 810, RNS 820, and E-UTRAN 830 may provide Mobile Station 801 with access to Core Network 840. The Core Network 840 may include of a series of devices that route data and communications between end users. Core Network 840 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 841 is part of Core Network 840, and interacts with Visitor Location Register (VLR) and Mobile-Services Switching Center (MSC) Server 860 and Gateway MSC Server 861 in order to facilitate Core Network 840 resource control in the CS domain. Functions of CS-MGW 841 include, but are not limited to, media conversion, bearer control, payload processing and other mobile network processing such as handover or anchoring. CS-MGW 840 may receive connections to Mobile Station 801 through BSS 810, RNS 820 or both.

Serving GPRS Support Node (SGSN) 842 stores subscriber data regarding Mobile Station 801 in order to facilitate network functionality. SGSN 842 may store subscription information such as, but not limited to, the International Mobile Subscriber Identity (IMSI), temporary identities, or Packet Data Protocol (PDP) addresses. SGSN 842 may also store location information such as, but not limited to, the Gateway GPRS Support Node (GGSN) 844 address for each GGSN where an active PDP exists. GGSN 844 may implement a location register function to store subscriber data it receives from SGSN 842 such as subscription or location information.

Serving Gateway (S-GW) 843 is an interface which provides connectivity between E-UTRAN 830 and Core Network 840. Functions of S-GW 843 include, but are not limited to, packet routing, packet forwarding, transport level packet processing, event reporting to Policy and Charging Rules Function (PCRF) 850, and mobility anchoring for inter-network mobility. PCRF 850 uses information gathered from S-GW 843, as well as other sources, to make applicable policy and charging decisions related to data flows, network resources and other network administration functions. Packet Data Network Gateway (PDN-GW) 845 may provide user-to-services connectivity functionality including, but not limited to, network-wide mobility anchoring, bearer session anchoring and control, and IP address allocation for PS domain connections.

Home Subscriber Server (HSS) 863 is a database for user information, and stores subscription data regarding Mobile Station 801 or User Equipment 802 for handling calls or data sessions. Networks may contain one HSS 863 or more if additional resources are required. Exemplary data stored by HSS 863 include, but is not limited to, user identification, numbering and addressing information, security information, or location information. HSS 863 may also provide call or session establishment procedures in both the PS and CS domains.

The VLR/MSC Server 860 provides user location functionality. When Mobile Station 801 enters a new network location, it begins a registration procedure. A MSC Server for that location transfers the location information to the VLR for the area. A VLR and MSC Server may be located in the same computing environment, as is shown by VLR/MSC Server 860, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 801 registration or procedures for handover of Mobile Station 801 to a different section of the Core Network 840. GMSC Server 861 may serve as a connection to alternate GMSC Servers for other mobile stations in larger networks.

Equipment Identity Register (EIR) 862 is a logical element which may store the International Mobile Equipment Identities (IMEI) for Mobile Station 801. In a typical embodiment, user equipment may be classified as either "white listed" or "black listed" depending on its status in the network. In one embodiment, if Mobile Station 801 is stolen and put to use by an unauthorized user, it may be registered as "black listed" in EIR 862, preventing its use on the network. Mobility Management Entity (MME) 864 is a control node which may track Mobile Station 801 or User Equipment 802 if the devices are idle. Additional functionality may include the ability of MME 864 to contact an idle Mobile Station 801 or User Equipment 802 if retransmission of a previous session is required.

While example embodiments of visual voice mail systems have been described in connection with various computing devices/processors, the underlying concepts can be applied to any computing device, processor, or system capable of receiving visual voice mail notifications as described herein. The methods and apparatuses for visual voice mail applications, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for visual voice mail applications. A computer-readable storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

While the present invention has been described in connection with the various embodiments of the various figures, it is to be understood that other similar embodiments can be used or modifications and additions can be made to the described embodiment for performing the same function without deviating therefrom. For example, one skilled in the art will recognize that the definitions and scopes of visual voice mail may include audio voice mail only and may apply to any environment, whether wired or wireless, and may be applied to any number of such devices connected via a communications network and interacting across the network. Moreover, the individual embodiments have been described separately, but one or more of such embodiments may be combined based on a number of factors, including network design, efficiency, customer preference, or any other design, implementation or cost criteria. Therefore, the method and system of the present disclosure should not be limited to any single embodiment, but rather should be construed in breadth and scope in accordance with the appended claims.

What is claimed:

1. A method comprising:
receiving a voice mail message directed to a user of a mobile device;
partitioning the voice mail message into a plurality of voice flows;
determining a user-programmable delay indicating a time period of acceptance of voice mail delivery;
determining, within the time period of acceptance, a network load; and
delivering a first voice flow of the plurality of voice flows within the time period of acceptance based on the network load for load balancing, wherein load balancing occurs during the user-programmable delay.

2. The method of claim 1, wherein the network load comprises no delay.

3. The method of claim 1, further comprising:
holding the voice mail message for delivery until the time period of acceptance.

4. The method of claim 1, further comprising:
converting the voice mail message to text; and
delivering the converted voice mail message.

5. The method of claim 1, further comprising:
upon a determination that the user is a member of a group, distributing the voice mail message to at least one other member of the group.

6. The method of claim 5, further comprising:
combining the voice mail message with a second voice mail message; and
distributing the combined voice mail message to at least one other member of the group.

7. A system comprising:
a processor; and
memory coupled to the processor, the memory comprising executable instructions that when executed by the processor cause the processor to effectuate operations comprising:
receiving a voice mail message directed to a user of a mobile device;
partitioning the voice mail message into a plurality of voice flows;
determining a user-programmable delay indicating a waiting period for voice mail delivery;
holding the voice mail message until expiration of the user-programmable delay;
delivering a first voice flow of the plurality of voice flows based on network traffic load balancing, wherein load balancing occurs during the user-programmable delay.

8. The system of claim 7, wherein the voice mail message is delivered based on a determination that a network load is acceptable.

9. The system of claim 7, the operations further comprising:

determining that the user is a member of a group; and
distributing the voice mail message to at least one other member of the group.

10. The system of claim 7, the operations further comprising:
responsive to receiving the voice mail message, condensing content of the voice mail message to generate a summary.

11. The system of claim 10, the operations further comprising:
determining that the user is a member of a group; and
distributing the summary to at least one other member of the group.

12. A non-transitory computer-readable storage medium comprising executable instructions that when executed by a processor cause the processor to effectuate operations comprising:
receiving a voice mail message directed to a user of a mobile device, wherein the voice mail message is received outside of a user-programmable time period indicating acceptance of voice mail message delivery;
partitioning the voice mail message into a plurality of voice flows;
holding the voice mail message until the time period of acceptance;
determining, within the time period of acceptance, a network load;
delivering a first voice flow of the plurality of voice flows within the time period of acceptance based on the network load for load balancing, wherein load balancing occurs during the user-programmable time period.

13. The computer-readable storage medium of claim 12, the operations further comprising:
responsive to receiving the voice mail message, condensing content of the voice mail message to generate a summary; and
delivering the summary to the user.

14. The computer-readable storage medium of claim 12, the operations further comprising:
determining that the user is a member of a group; and
distributing the voice mail message to at least one other member of the group.

15. The computer-readable storage medium of claim 12, the operations further comprising:
converting the voice mail message to a text message; and
upon a determination that the user is a member of a group, distributing the text message to at least one other member of the group.

16. The computer-readable storage medium of claim 12, the operations further comprising:
responsive to receiving the voice mail message, condensing content of the voice mail message to generate a summary.

17. The computer-readable storage medium of claim 16, the operations further comprising:
delivering the summary to the user; and
receiving a request from the user to deliver the voice mail message responsive to receipt of the summary.

18. The system of claim 7, the operations further comprising delivering one or more voice additional flows of the plurality of voice flows in addition to the first voice flow.

19. The system of claim 18, wherein the one or more voice additional flows is delivered incrementally based on a request from the user of the mobile device.

* * * * *